United States Patent
Levinson et al.

(10) Patent No.: US 10,468,062 B1
(45) Date of Patent: Nov. 5, 2019

(54) DETECTING ERRORS IN SENSOR DATA

(71) Applicant: Zoox, Inc., Menlo Park, CA (US)

(72) Inventors: Jesse Sol Levinson, Redwood City, CA (US); Nitesh Shroff, Millbrae, CA (US)

(73) Assignee: Zoox, Inc., Foster City, CA (US)

( * ) Notice: Subject to any disclaimer, the term of this patent is extended or adjusted under 35 U.S.C. 154(b) by 78 days.

(21) Appl. No.: 15/944,240

(22) Filed: Apr. 3, 2018

(51) Int. Cl.
| | | |
|---|---|---|
| *G11B 20/18* | (2006.01) | |
| *G01S 17/89* | (2006.01) | |
| *G01S 13/89* | (2006.01) | |
| *G06N 20/00* | (2019.01) | |

(52) U.S. Cl.
CPC .............. *G11B 20/18* (2013.01); *G01S 13/89* (2013.01); *G01S 17/89* (2013.01); *G06N 20/00* (2019.01)

(58) Field of Classification Search
CPC ......... G11B 20/18; G06N 20/00; G01S 17/06; G01S 13/89
See application file for complete search history.

(56) References Cited

U.S. PATENT DOCUMENTS

| | | | |
|---|---|---|---|
| 2014/0355150 A1 | 12/2014 | Johnson et al. | |
| 2016/0116593 A1* | 4/2016 | Kim | G01S 17/06 |
| | | | 701/70 |
| 2018/0068206 A1* | 3/2018 | Pollach | G06K 9/00791 |
| 2018/0373980 A1* | 12/2018 | Huval | G06N 3/08 |

FOREIGN PATENT DOCUMENTS

| | | |
|---|---|---|
| EP | 3091354 | 11/2016 |
| RU | 2037246 | 6/1995 |
| WO | WO2017189361 | 11/2017 |

OTHER PUBLICATIONS

The PCT Search Report and Written Opinion dated Jul. 4, 2019 for PCT Application No. PCT/US2019/025497, 8 pages.

* cited by examiner

*Primary Examiner* — Shelly A Chase
(74) *Attorney, Agent, or Firm* — Lee & Hayes, P.C.

(57) ABSTRACT

A method includes receiving a first signal from a first sensor, the first signal including data representing an environment. The method also includes receiving a second signal from a second sensor, the second signal including data representing the environment. The method further includes determining a group of objects based at least in part on the received data, and identifying an error associated with data included in the first signal and/or the second signal.

20 Claims, 7 Drawing Sheets

DETECTING ERRORS IN SENSOR DATA

BACKGROUND

Sensors may be used to generate sensor data indicative of objects in an environment. For example, multiple sensors may provide sensor data to a perception system configured to facilitate autonomous operation of a machine. The perception system may identify a group of objects present in the environment based on the sensor data. However, environmental conditions, damage, miscalibration, and other factors can hinder the effectiveness of one or more such sensors. Additionally, inadequate training data for a particular sensor modality may result in failure of the sensor modality to detect an object disposed in the environment. These situations may be particularly problematic when, for example, an autonomous vehicle operating without an operator relies at least in part on data generated by sensors for proper operation. If one or more of the sensors provides sensor data that is different from and/or that does not otherwise match the group of objects identified by the perception system, the autonomous vehicle may take actions based on inaccurate information related to the environment through which it is travelling. This may hinder operation of such vehicles or machines.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
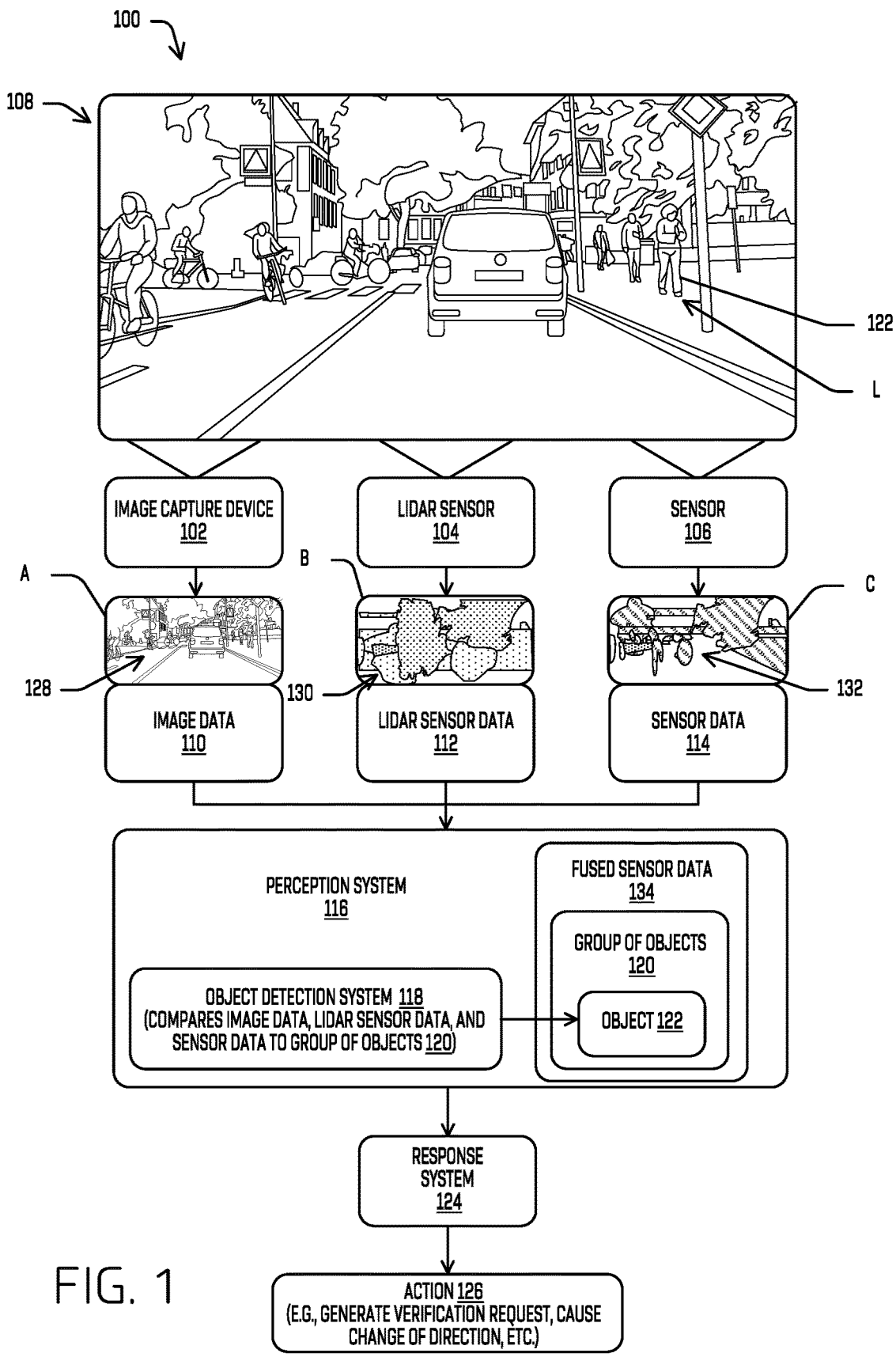
FIG. 1 is a pictorial flow diagram illustrating an example process for identifying an object or a group of objects in an environment, and determining that data received from one or more sensor modalities includes an error associated with the object or the group of objects. For example, such a process may include determining that an object is absent from or misclassified in a group of objects associated with data generated by an individual sensor.

As discussed above, autonomous vehicles and other machines rely on multiple sensors to provide input to a perception system to detect objects in an environment surrounding the autonomous vehicle or machine. Failure of one or more sensors to detect objects in the environment may hinder operation of such vehicles or machines, potentially creating unsafe operating conditions. However, it may not be immediately apparent that the sensor data of an individual sensor modality is not operating properly or that data output from the sensor modality is anomalous.

This application describes techniques for identifying errors associated with individual sensor modalities by identifying respective groups of objects using data generated by the individual sensor modalities (e.g., image data, light detection and ranging (LIDAR) sensor data, radio detection and ranging (RADAR) data, sound navigation and ranging (SONAR) data, etc.), and comparing the respective groups of objects (e.g., processed sensor data) to output of a perception system. The output of the perception system may comprise fused data from multiple sensors, and such fused data may include and/or comprise a group of objects predicted by the perception system as being present in the environment. Such comparisons may be used to identify sensors that are malfunctioning, that are in need of repair, and/or that are in need of calibration. Additionally, in some examples, the fused sensor data generated by the perception system may be used as ground truth when training individual sensor modalities, such as with a machine learning module, to further improve the performance of the individual sensor modalities.

In example embodiments, one or more systems of the present disclosure may include a plurality of sensors disposed on a vehicle, such as an autonomous vehicle, and operably connected to one or more processors and/or remote computing devices. The one or more processors may receive a first signal from a first sensor disposed on the vehicle. The first sensor may include an image capture device, and the first signal may include image data representing a scene (i.e. a portion of the environment visible to the image sensor as may be determined, for example, by a field of view), which may be a first scene, captured by the image capture device. Such image data may, for example, indicate a first scene illustrating and/or including a first group of objects detectable in an environment in which the first sensor and/or the vehicle is present. Such image data may include, for example, a plurality of images captured by the image capture device and indicative of the environment. Each such image may include a respective group of objects detectable by the image capture device in the environment. In such examples, the one or more processors may analyze each signal received from the first sensor to identify a respective group of objects indicated by the image data included in each signal.

The system may also include a second sensor disposed on the vehicle, and the second sensor may include a LIDAR sensor. The one or more processors may be configured to receive a second signal from the LIDAR sensor, and the second signal may include LIDAR sensor data. Such LIDAR sensor data may be captured simultaneously with the image data described above. In such examples, the LIDAR sensor data may represent a respective second scene (i.e. the portion of the environment visible to the LIDAR sensor) captured by the LIDAR sensor simultaneously with the image data described above. Such LIDAR sensor data may, for example, indicate a second scene captured by the LIDAR sensor including a second group of objects detectable within the environment. In such examples, the one or more processors may analyze each signal received from the LIDAR sensor to identify a respective group of objects indicated by the LIDAR sensor data included in each signal.

Depending on the accuracy and/or fidelity of the LIDAR sensor data, the objects included in, for example, the second group of objects may be the same as the objects included in the first group of objects detectable by the image capture device, which is to say that at least a portion of the first group of objects and a portion of the second group of objects is co-visible in the image and LIDAR sensors simultaneously.

The example system may also include one or more additional sensors (e.g., a RADAR sensor, a SONAR sensor, a depth sensing camera, time of flight sensors, etc.) disposed on the vehicle and configured to detect objects in the environment of the vehicle. The one or more additional sensors may output one or more respective signals to the one or more processors. For example, the one or more processors may receive a third signal from at least one of the additional sensors, and the third signal may include sensor data from at least one of the additional sensors. Such sensor data may be captured simultaneously with the image data and/or the LIDAR sensor data described above. In such examples, the sensor data may represent a respective third scene (i.e. the portion of the environment visible to the additional sensor) captured by the additional sensor simultaneously with the image data and/or the LIDAR sensor data described above. Such a third scene may include substantially the same objects captured by, for example, the image capture device and/or the LIDAR sensor. Such sensor data may, for example, indicate a third scene captured by the additional sensor including a third group of objects detectable within the environment. In such examples, the one or more processors may analyze each signal received from the additional sensor to identify a respective group of objects indicated by the sensor data included in each signal. Depending on the accuracy and/or fidelity of the sensor data received from the additional sensor, at least some of the objects included in the third group of objects may be the same as at least some of the objects included in the first group of objects detectable by the image capture device, and/or the same as at least some of the objects included in the second group of objects detectable by the LIDAR sensor. As will be described in greater detail below, one or more example scenes of the present disclosure, such as the first, second, and/or third scenes described above with respect to the image capture device, the LIDAR sensor, and the additional sensor, respectively, may comprise substantially simultaneous representations of the environment in which the respective sensors are located. Hence, one or more example scenes of the present disclosure may comprise a representation of the environment as detected, captured, sensed, and/or otherwise observed by a respective sensor.

In any of the examples described herein, the one or more processors, and/or one or more remote computing devices may identify and/or determine a further group of objects based at least in part on one or more of the signals received from the various sensors described above. For example, through one or more data fusion processes, a perception system of the present disclosure may generate fused sensor data that represents the environment. Such fused sensor data may, for example, include and/or identify a particular group of one or more objects predicted, determined, and/or otherwise indicated by the perception system as being be present within the environment based at least in part on the sensor data received from the individual sensor modalities. The one or more processors and/or remote computing devices of the present disclosure may treat the fused sensor data as ground truth for training object recognition and/or classification processes of individual sensor modalities at least because the group of objects is determined using information from multiple sources and, as a result, has a relatively high likelihood of accuracy as compared to each individual sensor modality.

In some examples, the one or more processors and/or remote computing devices may compare information included in and/or associated with each of the signals received from the respective sensor modalities to the fused sensor data (e.g., to the particular group of objects included in the fused sensor data) to identify any perceived errors in the groups of objects indicated by the respective sensor signals. For example, the one or more processors and/or remote computing devices may correlate the output of each sensor modality to a particular object and/or to a particular location. Using such data association and/or object characterization techniques, the output of each of the sensors described herein can be compared. Through such comparisons, the one or more processors and/or remote computing devices may identify one or more objects included in the fused sensor data, but absent from or misclassified in at least one of the group of objects associated with the respective sensor signals. In other examples, additional and/or different errors in the respective sensor signals may be identified, and such additional and/or different errors may include, among other things, differences in pose, differences in uncertainty of pose, differences in object size, differences in object location, differences in object extent, etc. In such examples, upon identifying and/or otherwise determining an error associated with data included in one or more of the respective sensor signals (e.g., upon determining that a particular object included in the fused sensor data is absent from or misclassified in at least one of the groups of objects indicated in the respective sensor signals), a response system of the present disclosure may initiate a response intended to correct this error and/or mitigate the effects of such an error during operation of the vehicle. Such an example response may be initiated in embodiments in which the processes described herein are performed during operation of the vehicle and/or in embodiments in which such processes are performed offline (e.g., during a training, programming, and/or machine learning exercise). Additionally or alternatively, in any of the examples described herein, the one or more signals received from the various sensors described above, and/or any of the groups of objects described herein, may be provided to a machine learning system of the present disclosure. Providing such information to a machine learning system may assist in improving the accuracy of training data utilized by such a system, thereby further enhancing the performance of the system and/or the operation of the vehicle, generally. Such information may be provided to a machine learning system in embodiments in which the processes described herein are performed during operation of the vehicle and/or in embodiments in which such processes are performed offline (e.g., during a training, programming, and/or machine learning exercise).

The techniques and systems described herein may be implemented in a number of ways. Example implementations are provided below with reference to the figures.

FIG. 1 is a pictorial flow diagram 100 of an example process for comparing individual sensor data with fused sensor data, and initiating a response based at least in part on determining an error associated with data included in one or more of the respective sensor signals (e.g., determining that at least one object included in the fused sensor data is absent from or misclassified in a group of objects determined based at least in part on data received from an individual sensor). As shown in FIG. 1, example sensors may include an image capture device 102, a LIDAR sensor 104, and/or one or more other sensors 106 that may be any type of sensor configured to generate signals indicative of an environment 108. Such environments 108 may include, for example, one or more objects, and such sensors 106 may comprise, for example, RADAR sensors, ultrasonic transducers such as SONAR sensors, time of flight sensors, as well as other sensors. The image capture device 102, the LIDAR sensor 104, and the sensor 106 may be coupled to a vehicle and may capture sensor data while the vehicle is travelling through the environment 108. For example, the vehicle may be an autonomous vehicle, such as the example vehicle described herein with respect to at least FIG. 2. The image capture device 102 may be any type of image capture device configured to capture images representative of the environment 108, such as, for example, one or more cameras (e.g., RGB-cameras, monochrome cameras, intensity (grey scale) cameras, infrared cameras, ultraviolet cameras, depth cameras, stereo cameras, etc.). The LIDAR sensor 104 may be any type of LIDAR sensor, and some examples may include only a single type of sensor or any combination of different types of sensors configured to generate data representative of the environment. Further, though depicted as single sensors for illustrative purposes, any number of image capture device(s) 102, LIDAR sensor(s) 104, and/or other sensor(s) 106 are contemplated.

In the example shown in FIG. 1, the image capture device 102 is depicted as capturing image data 110. Such image data 110 may be provided by the image capture device to one or more processors and/or other system components of the present disclosure in the form of one or more signals. For example, such signals may include image data 110 representing the environment 108. Image data 110 may comprise, for example, one or more images illustrating, indicating, and/or otherwise representing the environment 108. In some examples, the image data 110 may comprise one or more images captured by the image capture device 102, and the image data 110 may illustrate, indicate and/or otherwise represent a scene A that includes a corresponding group of objects of the environment 108 detected by the image capture device 102 at a particular time. As will be described below, in some examples, the image data 110 may be fused with additional sensor data received from other sensors (e.g. the LIDAR sensor 104, the additional sensor 106, etc.) to generate a more complete or accurate representation of the environment 108.

The example LIDAR sensor 104 shown in FIG. 1 is depicted as capturing LIDAR sensor data 112. Such LIDAR sensor data 112 may be provided by the LIDAR sensor 104 to one or more processors and/or other system components of the present disclosure in the form of one or more signals. For example, such signals may include LIDAR sensor data 112 representing the environment 108. The LIDAR sensor data 112 may illustrate, indicate and/or otherwise represent a scene B that includes a respective group of objects as detected by the LIDAR sensor 104 at a particular time. In examples in which the LIDAR sensor data 112 is captured simultaneously with the image data 110, the group of objects included in and/or represented in the scene B may be substantially the same as the group of objects included in the scene A associated with the image capture device. In such examples, each data acquisition of the LIDAR sensor 104 may result in LIDAR sensor data 112 representative of a respective scene.

In some examples, the LIDAR sensor data 112 may correspond to multiple data acquisitions of the LIDAR sensor 104 over time, and the LIDAR sensor data 112 may be fused with data from other sensors (e.g., image data 110, sensor data 114, etc.) to generate a more complete or accurate representation of the environment 108. The LIDAR sensor 104 may be configured such that the one or more lasers are mounted to spin (e.g., about a substantially vertical axis), thereby causing the lasers to sweep through, for example, 360 degrees, to capture LIDAR sensor data 112 associated with the environment 108. For example, the LIDAR sensor 104 may have a light emitter and a light sensor, with the light emitter including one or more lasers that direct highly focused light toward an object or surface, which reflects the light back to the light sensor, though any other light emission and detection to determine range is contemplated (e.g., flash LIDAR, MEMS LIDAR, solid state LIDAR, and the like). Measurements of the LIDAR sensor 104 may be represented as three-dimensional LIDAR sensor data having coordinates (e.g., Cartesian, polar, etc.) corresponding to positions or distances captured by the LIDAR sensor 104. For example, the three-dimensional LIDAR sensor data may include a three-dimensional map or point cloud, which may be represented as a plurality of vectors emanating from a light emitter and terminating at an object or surface. In some examples, converting operations may be used to convert the three-dimensional LIDAR sensor data to multi-channel two-dimensional data. In some examples, the LIDAR sensor data 112 may be automatically segmented, and the segmented LIDAR sensor data may be used, for example, as input for determining trajectories for an autonomous vehicle.

The example sensor 106 shown in FIG. 1 may be configured to capture sensor data 114. Such sensor data 114 may be provided by the sensor 106 to one or more processors and/or other system components of the present disclosure in the form of one or more signals. For example, such signals may include sensor data 114 representing the environment 108. The sensor data 114 may illustrate, indicate, and/or otherwise represent a scene C that includes a respective group of objects as detected by the sensor 106 at a particular time. In examples in which the sensor data 114 is captured simultaneously with the image data 110, the group of objects included in and/or represented in the scene C may be substantially the same as the group of objects included in the scene A associated with the image capture device. Similarly, in examples in which the sensor data 114 is captured simultaneously with the LIDAR sensor data 112, the group of objects included in the scene C may be substantially the same as the group of objects included in the scene B. In some examples, the sensor data 114 may be fused with additional sensor data received from other sensors (e.g. the LIDAR sensor 104, the image capture device 102, etc.) to generate a more complete or accurate representation of the environment 108.

In some examples, the image capture device 102, the LIDAR sensor 104, and/or the sensor 106 may capture different fields of view relative to the environment 108. As a result, each scene A, B, C may include a respective group of objects, sensed by the respective sensor, in the environment 108. For example, a signal generated by the image capture device 102 may include image data 110 representing the first scene A, and as shown in FIG. 1, the first scene A may illustrate and/or otherwise include a corresponding first group of objects 128 detected by the image capture device 102 at a particular time. Similarly, a signal generated by the LIDAR sensor 104 may include LIDAR sensor data 112 representing the second scene B, and the second scene B may include a corresponding second group of objects 130 detected by the LIDAR sensor 104 at a particular time.

Likewise, a signal generated by the sensor 106 may include sensor data 114 representing the third scene C, and the third scene C may include a corresponding third group of objects 132 detected by the sensor 106 at a particular time. As noted above, in any of the examples described herein, the image data 110, the LIDAR sensor data 112, and/or the sensor data 114 may be captured by the respective sensors 102, 104, 106 substantially simultaneously. In such examples, the scenes A, B, C may comprise substantially simultaneous representations of the environment 108. Additionally in such examples, the first group of objects 128 may include substantially the same objects as the second and third groups of objects 130, 132. Likewise, the second group of objects 130 may include substantially the same objects as the first and third groups of objects 128, 132. Similarly, the third group of objects 132 may include substantially the same objects as the first and second groups of objects 128, 130.

As shown in FIG. 1, the example process 100 may include communicating the image data 110, the LIDAR sensor data 112, and/or the sensor data 114 to one or more processors configured to identify one or more objects and/or one or more groups of objects present in the environment 108 based at least in part on such data. In some examples, the one or more processors may include and/or may be in communication with a perception system 116. The one or more processors and/or the perception system 116 may be configured to receive respective signals from the image capture device 102, the LIDAR sensor 104, and/or the sensor 106. The one or more processors and/or the perception system 116 may also be configured to identify groups of objects 128, 130, 132 based at least in part on the image data 110, the LIDAR sensor data 112, and the sensor data 114, respectively.

The one or more processors and/or the perception system 116 may further be configured to generate fused sensor data 134 based at least in part on the image data 110, the LIDAR sensor data 112, and/or the sensor data 114. Such fused sensor data 134 may include and/or otherwise comprise a group of objects 120 predicted, determined, and/or indicated by the perception system 116 as being present within the environment 108 at a particular time associated with the image data 110, the LIDAR sensor data 112, and/or the sensor data 114. An example group of objects 120 may be included in fused sensor data 134 and/or any other output of the perception system 116, and may include and/or identify one or more objects 122 determined by the perception system 116 as being present within the environment 108. In some examples, the perception system 116 may determine an error associated with data included in one or more respective sensor signals. For example, the perception system 116 may determine whether an object 122 included in the fused sensor data 134 (e.g., included in the particular group of objects 120) is absent from or misclassified in the group of objects 128 associated with (e.g., determined based on) the image data 110, the group of objects 130 associated with (e.g., determined based on) the LIDAR sensor data 112, and/or the group of objects 132 associated with (e.g., determined based on) the sensor data 114. Additionally or alternatively, in any of the examples described herein, the perception system 116 may determine any of the other errors noted above. For example, such errors determined by the perception system 116 may also include, among other things, differences in pose, differences in uncertainty of pose, differences in object size, differences in object location, differences in object extent, etc. In still further examples, the perception system 116 may compare the image data 110 to the LIDAR sensor data 112 and/or to the sensor data 114 in order to identify and/or otherwise determine an error or other discrepancy in the image data 110. Additionally or alternatively, the perception system 116 may compare the LIDAR sensor data 112 to the image data 110 and/or to the sensor data 114 in order to identify and/or otherwise determine an error or other discrepancy in the LIDAR sensor data 112. Further, the perception system 116 may compare the sensor data 114 to the image data 110 and/or to the LIDAR sensor data 112 in order to identify and/or otherwise determine an error or other discrepancy in the sensor data 114.

In some embodiments, the perception system 116 may utilize one or more algorithms, neural networks and/or other components to identify each object and/or parameters of each object (e.g., extents, sizes, orientations, etc., and/or uncertainties associated with each parameter) included in the group of objects 120. For example, the perception system 116 may use one or more data association engines, object recognition engines, object classification engines, and/or other components to correlate the output of the individual sensor modalities described herein to a particular object, thereby identifying the object or a group of objects. Additionally, an object detection system 118 associated with the perception system 116 may detect and/or otherwise determine a particular location of each respective identified object within the environment 108 at a corresponding time. For example, the object detection system 118 may determine a particular location L of the object 122 included in the group of objects 120, as well as a particular time at which the object 122 is/was disposed at the location L. Such a location L may comprise coordinates (e.g., Cartesian, polar, GPS, etc.) identifying the position of the object 122. In some examples, the image data 110 indicating the group of objects 128 may be determined by the image capture device 102 at a first time. Additionally, the LIDAR sensor data 112 indicating the group of objects 130 may be determined by the LIDAR sensor 104 simultaneously with the image data 110 (e.g., at the first time). In such examples, the object detection system 118 may identify the object 122 and may determine a particular location L of the object 122 corresponding to the first time.

In some example, the perception system 116 may also be in communication with a response system 124, and in some such examples, when the perception system 116 generates fused sensor data 134 including a group of objects 120, one or more signals indicative of the group of objects 120 may be communicated to the response system 124 by the perception system 116. The response system 124 may be configured to initiate a response and/or initiate any other action 126, based at least in part on the one or more signals indicative of the fused sensor data 134, the group of objects 120, and/or the identified object 122. For example, as shown in FIG. 1, the response system 124 may be configured to communicate an action 126 intended to mitigate the effects the perception system 116 identifying one or more errors associated with one or more of the determined groups of objects 128, 130, 132 and/or associated with at least one of the image data 110, the LIDAR sensor data 112, or the sensor data 114. For example, such an action 126 may mitigate the effects of the perception system 116 identifying an object 122 that is included in the fused sensor data 134, but that is absent from or misclassified in one or more of the groups of objects 128, 130, 132. Additionally or alternatively, as will be described below with respect to at least FIG. 5, the perception system 116 may also be in communication with a machine learning system, and in some such examples, when the perception system 116 identifies one or more errors associated with one or more of the determined groups of objects 128, 130, 132 and/or associated with at least one of the image data 110, the LIDAR sensor data 112, or the sensor data 114, the perception system 116 may provide one or more signals indicative of the error to the machine learning system. For example, in such embodiments the perception system 116 may provide a signal that is indicative of one or more of the determined groups of objects 128, 130, 132 and/or that includes at least one of the image data 110, the LIDAR sensor data 112, or the sensor data 114 to the machine learning system. The machine learning system may use information included in such a signal to assist in training a sensor modality corresponding to the determined error.

As noted above, each of the image capture device 102, the LIDAR sensor 104, and the sensor 106 may generate respective signals, and may provide such signals to the perception system 116. In some examples, such signals may be generated substantially continuously by the image capture device 102, the LIDAR sensor 104, and/or the sensor 106. In other examples, such signals may be generated at regular or irregular time intervals by the image capture device 102, the LIDAR sensor 104, and/or the sensor 106.

As is also noted above, a first signal generated by the image capture device 102 may include image data 110 representing the scene A indicative of the environment 108. The scene A and/or the image data 110 included in the first signal may include and/or indicate (e.g., the perception system 116 may process the first signal to determine) the first group of objects 128 detectable in the environment 108 in which the image capture device 102 is present. Similarly, a second signal generated by the LIDAR sensor 104 may include image data 112 representing the scene B indicative of the environment 108. The scene B and/or the LIDAR sensor data 112 included in the second signal may include and/or indicate (e.g., the perception system 116 may process the second signal to determine) the second group of objects 130 detectable in the environment 108. Likewise, a third signal generated by one or more additional sensor 106 may include sensor data 114 representing the scene C indicative of the environment 108. The scene C and/or the sensor data 114 included in the third signal may include and/or indicate (e.g., the perception system 116 may process the third signal to determine) the third group of objects 132 detectable in the environment 108. In such examples, the perception system 116 may also use one or more of the example fusion techniques described herein to generate the fused sensor data 134 based on the first signal, the second signal, and/or the third signal. The perception system 116 may also determine the group of objects 120, and/or identify one or more particular object 122 present in the environment 108 based at least in part on the image data 110, the LIDAR sensor data 112, and/or the sensor data 114 included in one or more of the received signals. The perception system 116 may also determine that at least one object 122 is included in the fused sensor data 134, and is absent from or misclassified in at least one of the first group of objects 128, the second group of objects 130, or the third group of objects 132. Such a determination may be communicated to the response system 124, which may in turn, initiate a response and/or initiate any other action 126 to correct such a discrepancy. Such a determination may also be communicated to the machine learning system described herein. It is understood that such a determination and/or corresponding information may be communicated to the response system 124 in embodiments in which the processes described herein are performed online (e.g., by one or more processors disposed on a vehicle during operation of the vehicle) and/or in embodiments in which such processes are performed offline (e.g., by one or more remote computing devices during a training, programming, and/or machine learning exercise associated with such a vehicle). Likewise, such a determination and/or corresponding information may be provided to a machine learning system in embodiments in which the processes described herein are performed online and/or in embodiments in which such processes are performed offline.

In any of the examples described herein, the various sensor modalities may each have corresponding levels of confidence associated therewith. For example, signals and/or image data 110 provided by the image capture device 102 may be characterized by a relatively high first confidence level (or correspondingly low uncertainty). For example, such signals and/or image data 110 may be characterized by a first confidence level between approximately 90% and approximately 98%. Additionally, for example, signals and/or LIDAR sensor data 112 provided by the LIDAR sensor 104 may have a second confidence level less than the first confidence level associated with the signals and/or image data 110 provided by the image capture device 102. For example, such signals and/or LIDAR sensor data 112 may be characterized by a second confidence level between approximately 85% and approximately 90%. The above confidence levels are merely examples, and in further embodiments, the image data 110, LIDAR sensor data 12, and/or sensor data 114 may be characterized by confidence levels greater than or less than those identified above. In examples in which a particular object is determined by the perception system 116 as being included in the group of objects 128 associated with the image capture device 102, but is determined by the perception system 116 as being absent from or misclassified in the group of objects 130 associated with the LIDAR sensor 104, the perception system 116 may include such a particular object in the fused sensor data 134 (e.g., may include the particular object in the group of objects 120) based at least partly on at least one of the first confidence level or the second confidence level. As noted above, in additional examples, the perception system 116 may determine one or more additional and/or different errors associated with data included in one or more of the respective sensor signals.

In still further examples, statistical information may be stored in a memory accessible by the perception system 116 and/or otherwise associated with one or more of the image capture device 102, the LIDAR sensor 104, or the sensor 106. Such statistical information may comprise, for example, aggregated empirical data associated with a respective one of the sensors and indicative of the accuracy and/or consistency of the data captured by the sensor. For example, the LIDAR sensor 104 may capture LIDAR sensor data 112 that is approximately 95% accurate when sensing a particular object from a distance of approximately 10 m or less. In such examples, the perception system 116 may identify the particular object using the sensor data 112 with 95% accuracy. Additionally or alternatively, the LIDAR sensor 104 may capture LIDAR sensor data 112 that is approximately 90% accurate when sensing the particular object from a distance greater than approximately 10 m and less than approximately 30 m. In such examples, the perception system 116 may identify the particular object using the sensor data 112 with 90% accuracy. Such accuracy percentages and distances are merely exemplary. Moreover, such accuracy percentages and/or other statistical information may be determined over a period of time based on repeated use of the LIDAR sensor 104 in one or more environments 108. Additional or alternatively, such accuracy percentages and/or other statistical information may be determined empirically through testing of the LIDAR sensor 104.

Further, in such examples the perception system 116 and/or other components associated with one or more processors of a vehicle may perform a probabilistic comparison or other comparison between such stored statistical information and aggregated statistical information collected over a period of time during use of the vehicle. For example, the perception system 116 and/or other components associated with one or more processors of the vehicle may aggregate accuracy percentages and/or other statistical information corresponding to one or more of the sensors during use of the vehicle. In such examples, the perception system 116 and/or other components associated with one or more processors of the vehicle may compare such "in-use" statistical information with stored statistical information associated with a corresponding sensor modality (e.g., in-use statistical information of the LIDAR sensor 104 may be probabilistically compared to stored LIDAR sensor statistical information). In such examples, if the in-use statistical information (e.g., accuracy percentage) is outside of a predetermined range of the stored statistical information (e.g., +/−3%) during use of the vehicle, such a determination may be communicated to the response system 124, which may in turn, initiate a response and/or initiate any other action 126 to correct such a discrepancy. Additionally or alternatively, such a determination may cause the LIDAR sensor data 112 collected using the LIDAR sensor 104 to not be used in training the various sensor modalities. For instance, such a determination may cause the LIDAR sensor data 112 collected using the LIDAR sensor 104 to not be provided to the machine learning system described above.

Figure 2:
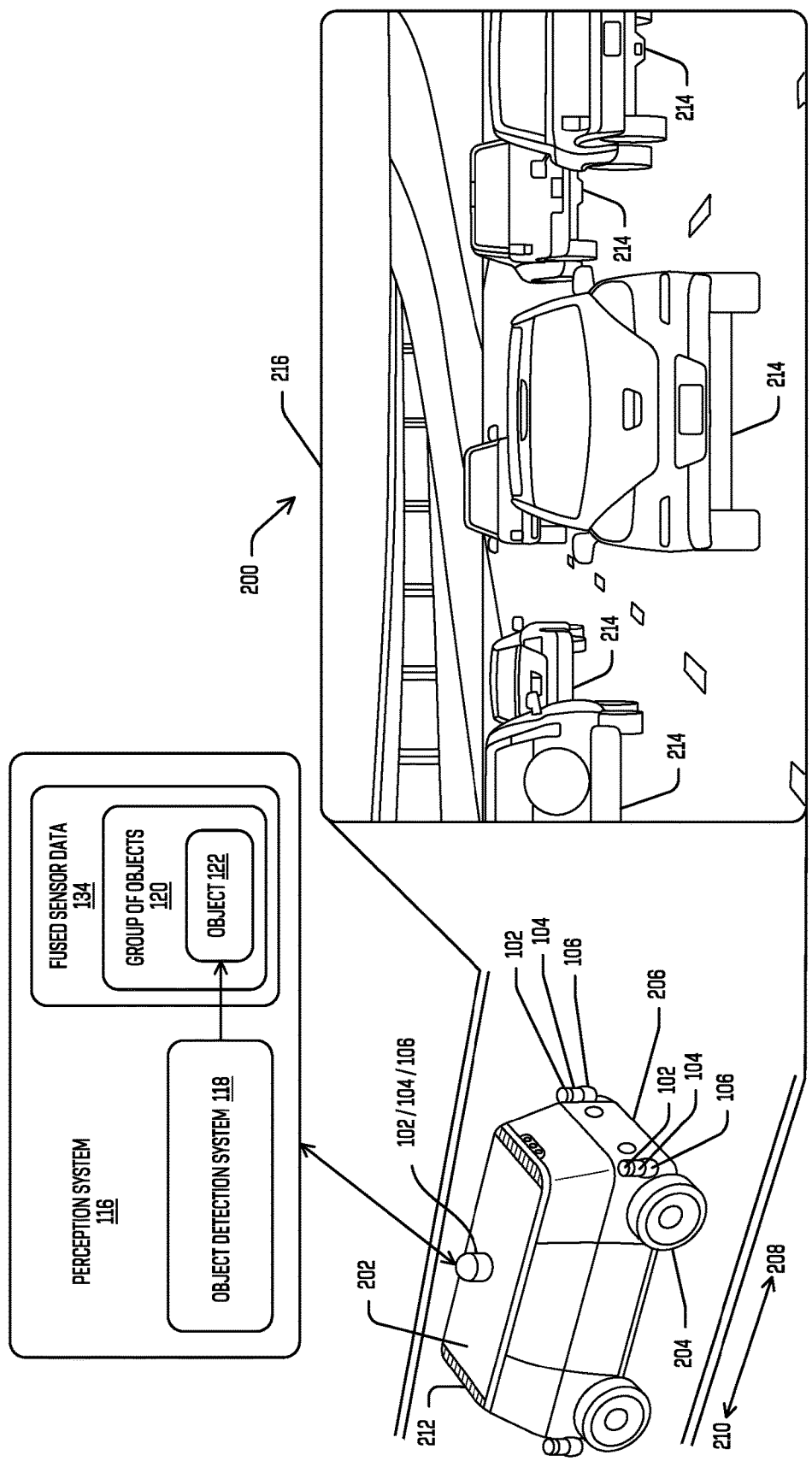
FIG. 2 illustrates an example environment through which an example vehicle is travelling and capturing sensor data.

FIG. 2 shows an example environment 200 through which an example vehicle 202 is traveling. The example vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 202 may be any configuration of vehicle, such as, for example, a van, a sport utility vehicle, a cross-over vehicle, a truck, a bus, an agricultural vehicle, and a construction vehicle. The vehicle 202 may be powered by one or more internal combustion engines, one or more electric motors, hydrogen power, any combination thereof, and/or any other suitable power sources. Although the example vehicle 202 has four wheels 204, the systems and methods described herein may be incorporated into vehicles having fewer or a greater number of wheels, tires, and/or tracks. The example vehicle 202 may have four-wheel steering and may operate generally with equal performance characteristics in all directions, for example, such that a first end 206 of the vehicle 202 is the front end of the vehicle 202 when travelling in a first direction 208, and such that the first end 206 becomes the rear end of the vehicle 202 when traveling in the opposite, second direction 210, as shown in FIG. 2. Similarly, a second end 212 of the vehicle 202 is the front end of the vehicle 202 when travelling in the second direction 210, and such that the second end 212 becomes the rear end of the vehicle 202 when traveling in the opposite, first direction 208. These example characteristics may facilitate greater maneuverability, for example, in small spaces or crowded environments, such as parking lots and urban areas.

The vehicle 202 may travel through the environment 200, relying at least in part on sensor data indicative of objects in the environment 200 in order to determine trajectories of the vehicle 202. For example, as the vehicle 202 travels through the environment 200, one or more image capture devices 102, LIDAR sensors 104, and/or other types of sensors 106 capture data associated with detected objects (e.g., vehicles 214 shown in FIG. 2, and/or pedestrians, buildings, barriers, road signs, etc.). The data captured may be used, for example, as input for determining trajectories for the vehicle 202. As schematically depicted in FIG. 2, and as noted above with respect to FIG. 1, the vehicle 202 may include a perception system 116 configured to receive respective signals from one or more of the sensors (e.g., the image capture device(s) 102, the LIDAR sensor(s) 104, and/or the other types of sensor(s) 106). In some examples, the perception system 116 may be configured to identify one or more objects (e.g., one or more of the vehicles 214 illustrated in FIG. 2, one or more groups of objects 128, 130, 132 described with respect to FIG. 1, etc.) based at least in part on one or more such signals. The perception system 116 may also be configured to generate fused sensor data 134 comprising a group of objects 120. In such examples, the perception system 116 may also be configured to determine an error associated with data included in one or more of the respective sensor signals and/or with the one or more groups of objects 128, 130, 132. For example, an object detection system 118 associated with the perception system 116 may be configured to identify one or more objects 122 of the group of objects 120 that is absent from or misclassified in one or more of the groups of objects 128, 130, 132. In such examples, a response system associated with the perception system 116 may initiate a response and/or any other action in order to correct such a discrepancy.

Figure 3:
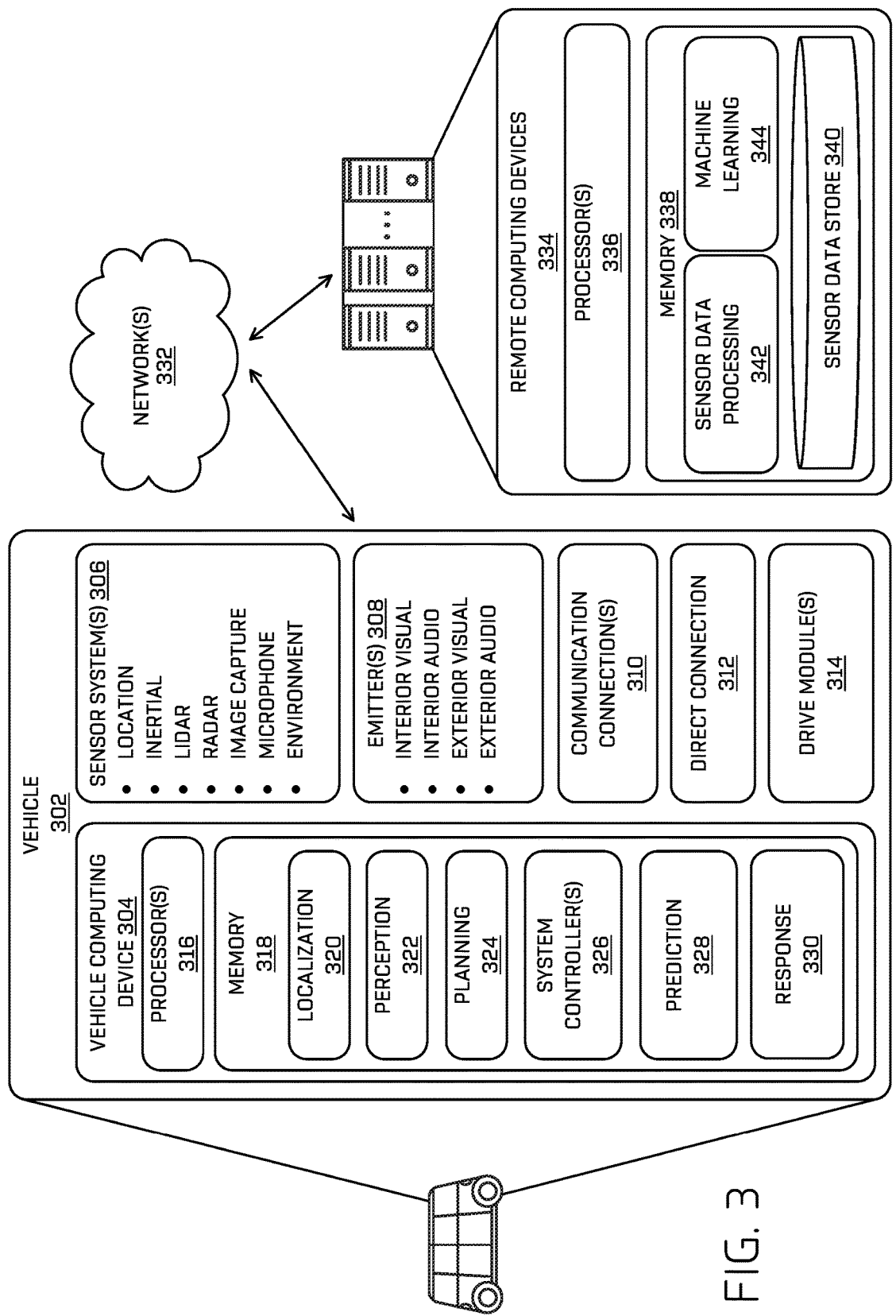
FIG. 3 illustrates an example system for identifying objects and initiating responses.

FIG. 3 is a block diagram illustrating an example system 300 for implementing one or more of the example processes described herein. For example, the system 300 may be configured to identify objects and initiate responses based at least in part on the sensor data described herein. In at least one example, the system 300 can include a vehicle 302, which can be the same vehicle as the vehicle 202 described above with reference to FIG. 2.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the one or more processors 316. In the illustrated example, the vehicle 302 is an autonomous vehicle; however, the vehicle 302 could be any other type of vehicle. In the illustrated example, the memory 318 of the vehicle computing device 304 stores a localization system 320, a perception system 322 (e.g., the perception system 116 described above with respect to FIGS. 1 and 2, and including the detection system 118), a planning system 324, one or more system controllers 326, a prediction system 328, and a response system 330 (e.g., the response system 124 described above with respect to FIGS. 1 and 2). Though depicted in FIG. 3 as residing in memory 318 for illustrative purposes, it is contemplated that the perception system 322, response system 330, and/or other components of the vehicle computing device 304 may additionally, or alternatively, be accessible to the vehicle 302 (e.g., stored remotely).

In at least one example, the localization system 320 can determine where the vehicle 302 is in relation to a local and/or global map based at least in part on sensor data received from the sensor system(s) 306, the perception system 322 to perform entity detection, segmentation, and/or classification based at least in part on sensor data received from the sensor system(s) 306, and the planning system 324 to determine routes and/or trajectories to used to control the vehicle 302 based at least in part on sensor data received from the sensor system(s) 306. Additional details of localizer systems, perception systems, and planning systems that are usable can be found in U.S. patent application Ser. No. 14/932,963, filed Nov. 4, 2015, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference. In an example where the vehicle 302 is not an autonomous vehicle, one or more such components can be omitted from the vehicle 302.

In at least one example, the localization system 320, perception system 322, and/or the planning system 324 can process sensor data received from the sensor system(s), and can send their respective outputs, over one or more network(s) 332, to one or more remote computing device(s) 334 (e.g., one or more server computers or other computing devices). In such examples, the sensor system(s) 306 may include the image capture device 102, the LIDAR sensor 104, and/or the one or more additional sensors 106 described above. In at least one example, the localization system 320, perception system 322, and/or the planning system 324 can send their respective outputs to the one or more remote computing device(s) 334 at a particular frequency, after a lapse of a predetermined period of time, in near real-time, etc.

In at least one example, the one or more system controller(s) 326 can be configured to control steering, propulsion, braking, safety, emitters, communication, and other systems of the vehicle 302. These system controller(s) 326 can communicate with and/or control corresponding systems of the drive module(s) 314 and/or other components of the vehicle 302.

In at least one example, the prediction system 328 can receive sensor data directly from the sensor system(s) 306 and/or from one of the other systems (e.g., the localization system 320, the perception system 322, etc.). In some examples, if the prediction system 328 receives sensor data from the sensor system(s) 306, the sensor data can be raw sensor data. In additional and/or alternative examples, if the prediction system 328 receives sensor data from one of the other systems, the sensor data can be processed sensor data. For instance, in an example, the localization system 320 can process the image data 110, the LIDAR sensor data 112, and/or the sensor data 114 to determine where the vehicle 302 is in relation to a local and/or global map and can output processed sensor data (e.g., location data) indicating such information. Additionally and/or alternatively, the perception system 322 can process the sensor data to perform object detection, segmentation, and/or classification. In some examples, the perception system 322 can provide processed sensor data that indicates the presence of an object (e.g., the object 122 described above with respect to FIG. 1) that is proximate to the vehicle 302 and/or a classification of the object as an object type (e.g., car, pedestrian, cyclist, barrier, road sign, unknown, etc.). In additional and/or alternative examples, the perception system 322 can provide processed sensor data that indicates one or more characteristics associated with a detected entity and/or the environment in which the entity is positioned. In some examples, characteristics associated with an object 122 identified by the perception system 322 can include, but are not limited to, an x-position (global position), a y-position (global position), a z-position (global position), an orientation, an object type (e.g., a classification), a velocity of the object, etc. Characteristics associated with the environment can include, but are not limited to, a presence of another object in the environment, a state of another object in the environment, a time of day, a day of a week, a season, a weather condition, an indication of darkness/light, etc.

For example, sensor system(s) 306 may include image capture devices 102, such as any cameras (e.g., RGB-cameras, monochrome cameras, intensity (grey scale) cameras, infrared cameras, ultraviolet cameras, depth cameras, stereo cameras, and the like). Such image capture devices 102 may capture image data 110 indicating the group of objects 128, and the sensor system(s) 306 may transmit image data 110 to the perception system 322 and/or other systems of the vehicle computing device 304 for subsequent processing.

Likewise, the sensor system(s) 306 may include one or more LIDAR sensors 104 configured to capture LIDAR sensor data 112 for use, as described herein. For example, the sensor system(s) 306 may be configured to combine or synthesize LIDAR data from a plurality of LIDAR sensors 104 to generate a meta spin of LIDAR data, which may be LIDAR sensor data 112 generated by multiple LIDAR sensors 104. In the case of a meta spin of LIDAR data, the sensor system(s) 306 may be configured to determine a virtual origin (e.g., common origin) of the meta spin data. In some examples, the sensor system(s) 306 may be configured to determine a range between a LIDAR sensor 104 and a point of an object or surface, and in some examples, the sensor system(s) 306 may be configured to determine a surface normal vector for each point captured and/or sensed by a respective LIDAR sensor 104. As a non-limiting example, such a surface normal determination may be performed by calculating the normal of the cross product of vectors indicating directions from the point to two of the point's nearest neighboring points. As may be understood in the context of this disclosure, the sensor system(s) 306 may transmit any such LIDAR sensor data 112 to the perception system 322 and/or other systems of the vehicle computing device 304 for subsequent processing.

In some examples, the sensor system(s) 306 may provide image data 110, LIDAR sensor data 112, and/or other sensor data 114 to the vehicle computing device 304 for combining, fusing, segmenting, classifying, labeling, synthesizing, and/or otherwise processing the data. In some examples, the memory 318 of the vehicle computing device 304 may also store simulated data that has been generated by a computer simulation algorithm, for use in part in testing. In some examples, the simulated data may include any type of simulated data, such as image data, sensor data (e.g., LIDAR data, RADAR data, and/or SONAR data), GPS data, etc. In some examples, the computer system(s) 302 may be configured to modify, transform, and/or perform converting operations on the simulated data for verifying an operation and/or for training models executable by machine learning systems.

In some examples, the prediction system 328 can access a heat map and/or other information stored in the memory 318, and can perform a look-up using such information to assist in predicting future behaviors of the identified object 122. In at least one example, the heat map and/or other information stored in the memory 318 can be associated with an object type (e.g., car, pedestrian, cyclist, barrier, road sign, unknown, etc.). In at least one example, the prediction system 328 can perform a look-up to determine a pattern of behavior associated with the detected object type. In at least one example, the prediction system 328 can utilize a location of an object and one or more characteristics to identify a cell in a heat map. That is, a cell can be indicative of, or otherwise be referenced by, a unique index comprising the location of the object and one or more characteristics associated with the object and/or the environment in which the object is present. In some examples, the cell can be associated with data indicative of a pattern of behavior of one or more objects (of a same object type) in the location having the same one or more characteristics of the object and/or the environment. The prediction system 328 can retrieve the data indicative of the pattern of behavior associated with the cell and can utilize the data indicative of the pattern of behavior to determine a predicted behavior of the object.

Based at least in part on determining a predicted behavior of an object, the prediction system 328 can provide an indication of the predicted behavior to other systems of the vehicle computing device 304. In at least one example, the predicted behavior can be used to inform the perception system 322 for performing object detection, segmentation, and/or classification (e.g., in an example, a heat map and/or other information related to an identified object 122 can be used for performing an inverse look-up to determine an object type). Additionally and/or alternatively, the planning system 324 can utilize the predicted behavior for determining a trajectory along which the vehicle 302 can travel. The planning system 324 can send the trajectory to the system controller(s) 326, which can execute the trajectory to cause the vehicle 302 to drive along the trajectory (e.g., in the example of an autonomous vehicle). Additionally and/or alternatively, the predicted behavior can be used for weighting trajectories generated by the planning system 324 that can determine routes and/or trajectories to use to control the vehicle 302. Furthermore, the predicted behavior can be used to inform a neural network that can be used to predict behavior(s) of entity(s).

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras and/or other image capture devices (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, cameras and/or other image capture devices can include multiple cameras disposed at various locations about the exterior and/or interior of the vehicle 302.

The sensor system(s) 306 can provide signals to the vehicle computing device 304. For example, each of the sensors included in the sensor system(s) 306 may be configured to send respective signals to the vehicle computing device 304, and such signals may include data indicating groups of objects detected by the respective sensor. In some examples, an image capture device 102 of the sensor system(s) 306 may provide a first signal to the vehicle computing device 304, and the first signal may include image data 110 indicating a first group of objects 128 detectable in the environment 108 in which the image capture device 102 is present. Additionally, LIDAR sensor 104 of the sensor system(s) 306 may provide a second signal to the vehicle computing device 304, and the second signal may include LIDAR sensor data 112 indicating a second group of objects 130 detectable in the environment 108. Further, a RADAR sensor or one or more additional sensors 106 of the sensor system(s) 306 may provide a third signal to the vehicle computing device 304, and the third signal may include sensor data 114 indicating a third group of objects 132 detectable in the environment 108. In such examples, the perception system 322 (e.g., the object detection system 118 described above) may identify and/or determine a group of objects 120 present in the environment 108 based at least in part on one or more of the signals received from the sensor system(s) 306. For example, the perception system 322 (e.g., the object detection system 118) may identify at least one object 122 present in the environment 108 based at least in part on the one or more of the signals received from the sensor system(s) 306. The perception system 322 may also identify and/or otherwise determine an error associated with data included in one or more of the respective sensor signals (e.g., determine whether the identified object 122 is absent from or misclassified in one or more of the groups of objects 128, 130, 132 associated with the received signals).

In examples in which the perception system 322 determines that the object 122 is absent from or misclassified in at least one of the groups of objects 128, 130, 132, the response system 330 may initiate a response 126 and/or any other action based at least in part on such a determination. In some examples, such a response and/or other action 126 may include, among other things, at least one of ignoring a portion of the image data 110, the LIDAR sensor data 112, and/or the sensor data 114. Such a response and/or other action 126 may also include modifying a weight, confidence value, and/or other metric associated with one or more of the image capture device 102, the LIDAR sensor 104, the one or more additional sensors 106, other sensors of the sensor system(s) 306, and/or signals received from the respective sensors of the sensor system(s) 306. Such a response and/or other action 126 may further include modifying training data associated with one or more of the image capture device 102, the LIDAR sensor 104, the one or more additional sensors 106, other sensors of the sensor system(s) 306.

In some examples, such a response and/or other action 126 may also include generating a verification request and/or sending, using the communication connection(s) 310, such a verification request to a service center for consideration by a human operator (e.g., teleoperator). Such a teleoperator may provide one or more indications that the sensor in question is malfunctioning, may confirm a proposed solution and/or mitigation action, or may otherwise communicate control data to the vehicle 302 in response to receiving the indication of sensor error Such a response and/or other action 126 may also include controlling the drive module(s) 314 to change a speed, direction, and/or other operating parameter of the vehicle 302. Additionally and/or alternatively, the sensor system(s) 306 can send any of the signals and/or sensor data described herein, via the one or more networks 332, to the one or more remote computing device(s) 334 at a particular frequency, after a lapse of a predetermined period of time, in near real-time, etc. In such examples, the one or more remote computing device(s) 334 (e.g., one or more processor(s) 336 thereof) may perform one or more of the processes described herein.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle 302 to communicate with other nearby computing device(s) (e.g., other nearby vehicles, traffic signals, etc.). The communications connection(s) 310 also enable the vehicle 302 to communicate with a remote teleoperations computing device, a remote service center, or other remote services.

The communications connection(s) 310 can include physical and/or logical interfaces for connecting the vehicle computing device 304 to another computing device or a network, such as network(s) 332. For example, the communications connection(s) 310 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

As described above, the vehicle 302 can send signals and/or sensor data to one or more remote computing device(s) 334, via the network(s) 332. In some examples, the vehicle 302 can send raw sensor data to the remote computing device(s) 334. In other examples, the vehicle 302 can send processed sensor data and/or representations of sensor data to the remote computing device(s) 334. In some examples, the vehicle 302 can send sensor data to the remote computing device(s) 334 at a particular frequency, after a lapse of a predetermined period of time, in near real-time, etc.

The remote computing device(s) 334 can receive the signals and/or sensor data (raw or processed) and can perform any of the processes described herein based at least in part on the signals and/or sensor data. In at least one example, the remote computing device(s) 334 can include one or more processors 336 and memory 338 communicatively coupled with the one or more processors 336. In the illustrated example, the memory 338 of the remote computing device(s) 334 stores a sensor data store 340, a sensor data processing system 342, and a machine learning system 344.

The sensor data store 340 can store sensor data (raw or processed) received from one or more vehicles, such as vehicle 302. The sensor data in the sensor data store 340 can represent sensor data collected by one or more onboard sensor systems (e.g., such as onboard sensor system(s) 306), or other sensor system(s), at previous time(s) (e.g., previously connected sensor data). In some examples, the sensor data can be stored in association with locations, object types, and/or other types of characteristics. Additionally, in at least one example, behaviors determined from the sensor data can be stored in the sensor data store 340. That is, the behaviors of individual objects can be associated with particular sensor data from which the behaviors were determined.

In at least one example, the sensor data processing system 342 can receive sensor data (raw or processed) from one or more vehicles, such as the vehicle 302. As described above, the vehicle 302 can send signals including sensor data to the remote computing device(s) 334 at a particular frequency, after a lapse of a predetermined period of time, in near real-time, etc. Accordingly, the sensor data processing system 342 can receive the sensor data at a particular frequency, after a lapse of a predetermined period of time, in near real-time, etc. In additional and/or alternative examples, the sensor data processing system 342 can receive data from additional and/or alternative sensor system(s) (e.g., that are not associated with a vehicle). In some examples, the sensor data processing system 342 can send the sensor data to the sensor data store 340 for storage.

In at least one example, the sensor data processing system 342 can process the sensor data. In some examples, the sensor data processing system 342 can determine a behavior of an object associated with a particular object type based on the sensor data. That is, the sensor data processing system 342 can analyze sensor data associated with a particular period of time to determine how objects(s) present in an environment behave during the period of time. In at least one example, the sensor data store 340 can store data indicative of a behavior of an object that is associated with an object type, which can be associated in the sensor data store 340 with sensor data utilized to determine the behavior. In at least one example, data indicative of a behavior of an object associated with an object type, as determined from sensor data, can be associated with an observation. Such observations can be stored in the sensor data store 340.

As noted above, the localization system 320, the perception system 322 and/or other components of the vehicle computing device 304 may be configured to detect and classify external objects, such as, for example, pedestrians, bicyclists, dogs, other vehicles, etc. Based at least in part on the classifications of the external objects, the external objects may be labeled as dynamic objects or static objects. For example, the perception system 322 may be configured to label a tree as a static object, and may be configured to label a pedestrian as a dynamic object. Further data about external objects may be generated by tracking the external objects, and the object classification type may be used by the prediction system 328, in some examples, to predict or determine the likelihood that an external object may interfere with the vehicle 302 as it travels along a planned path. For example, an external object that is classified as a pedestrian may be associated with a maximum speed and/or an average speed. The localization system 320, the perception system 322, a segmentation system of the vehicle computing device 304, the sensor data processing system 342, and/or other components of the remote computing devices 334 may use the machine learning system 344, which may execute any one or more machine learning algorithms, such as, for example, neural networks, to perform classification operations.

A neural network utilized by the machine learning system 344 may comprise a biologically inspired algorithm, which passes input data through a series of connected layers to produce an output. One example of a neural network is the convolutional neural network (CNN). Each layer in a CNN may also include another CNN, or may include any number of layers. A neural network may utilize machine learning, which is a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, backpropagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In some examples, more than one type of machine learning system may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc. Additionally, although the machine learning system 344 is illustrated as a component of the memory 338, in other examples, the machine learning system 344 and/or at least a portion thereof, may comprise a component of the memory 318 of the vehicle computing device 304.

The processor(s) 316 of the vehicle 302 and the processor(s) 336 of the remote computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and memory 338 are examples of non-transitory computer-readable media. Memory 318 and memory 338 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the remote computing device(s) 334 and/or components of the remote computing device(s) 334 can be associated with the vehicle 302. That is, the vehicle 302 can perform one or more of the functions associated with the remote computing device(s) 334, and vice versa.

Figure 4A:
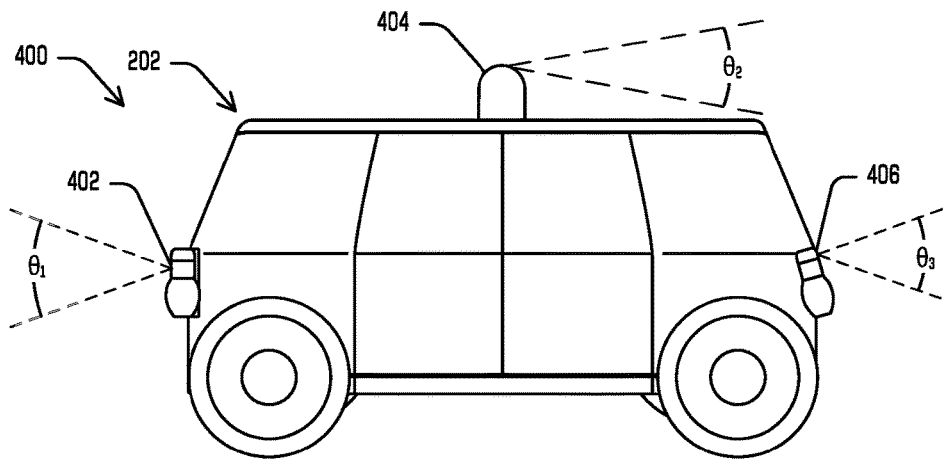
FIG. 4A illustrates a side view of an example vehicle having multiple sensor types.

FIG. 4A is a side view 400 of an example vehicle 202 (e.g., the vehicle 302 described with respect to FIG. 3) having multiple sensor assemblies mounted on, or carried by, the vehicle 202. In some examples, datasets from the multiple sensor assemblies may be combined or synthesized to form a meta spin (e.g., LIDAR data representing a plurality of LIDAR sensors) or can be combined or fused using sensor fusion techniques to improve accuracy or processing for segmentation, classification, prediction, planning, trajectory generation, etc.

As shown in the side view 400, the vehicle 202 may include any number of sensors in any combination or configuration. For example, the vehicle 202 includes at least sensors 402, 404, and 406. In some instances, the sensor 402 may include a RADAR sensor having a vertical field of view illustrated as $\theta_1$. The sensor 404 may include a LIDAR sensor mounted on a roof of the vehicle 202, the sensor 404 having a vertical field of view illustrated as $\theta_2$. In some instances, the sensor 406 may include a camera sensor having a vertical field of view $\theta_3$. Of course, the vehicle 202 may include any number and type of sensors, and is not limited to the examples provided in FIG. 4A.

Figure 4B:
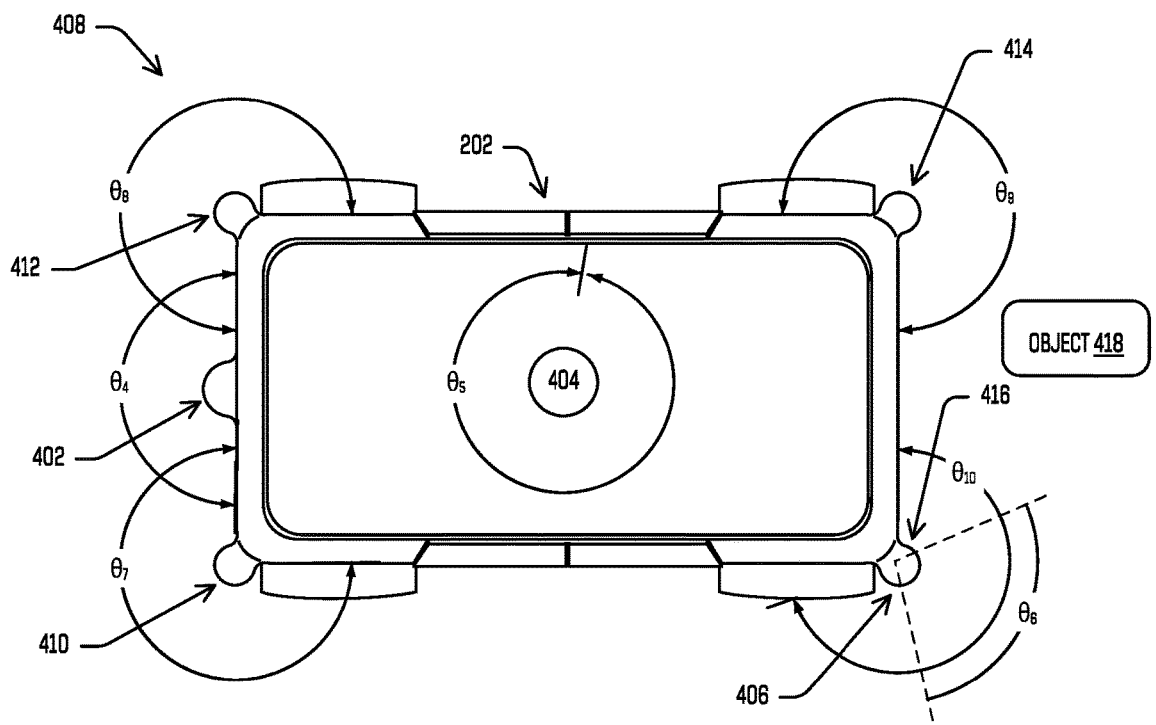
FIG. 4B illustrates a top view of the example vehicle shown in FIG. 4A.

FIG. 4B depicts a top plan view 408 of the example vehicle 202 having multiple sensor assemblies mounted to the vehicle. For example, the sensors 402, 404, and 406 can be seen in FIG. 4B, as well as additional sensors 410, 412, 414, and 416. For example, the sensors 406 and 416 may be co-located or located proximate to one another, but may include different sensor types or modalities, having different fields of view. In some instances, the sensors 410, 412, 414, and 416 may include additional LIDAR sensors, RADAR sensors, and/or image capture devices. As may be understood in the context of this disclosure, the vehicle 202 may include any number and any type of sensors. As illustrated in FIG. 4B, the sensor 402 may include a horizontal field of view $\theta_4$, the sensor 404 may include a horizontal field of view $\theta_5$, the sensor 406 may include a horizontal field of view $\theta_6$, the sensor 410 may include a horizontal field of view $\theta_7$, the sensor 412 may include a horizontal field of view $\theta_8$, the sensor 414 may include a horizontal field of view $\theta_9$, and the sensor 416 may include a horizontal field of view $\theta_{10}$. As may be understood in the context of this disclosure, the mounting locations and fields of view may include any number of configurations.

Additionally, one or more of the sensors described herein may be used to detect one or more objects 418 located within an environment in which the vehicle 202 and/or the sensors are present. For example, in embodiments in which the sensor 404 comprises a LIDAR sensor (e.g., a LIDAR sensor 104), the sensor 404 may be configured to generate a signal including LIDAR sensor data 112 indicating a group of objects 130 detectable in an environment (e.g., the environment 108 illustrated in FIG. 1) in which the sensor 404 is present. In some examples, the signal generated by the LIDAR sensor 404 may comprise a signal (e.g., a first signal) from a first light sensor of the LIDAR sensor 404 indicating detection of reflected light from the object 418, and the object 418 may be included in the group of objects 130 indicated by the sensor data 112. In such examples, the signal generated by the LIDAR sensor 404 may also comprise one or more additional signals (e.g., at least a second signal from a second light sensor of the LIDAR sensor 404) indicating detection of reflected light from the object 418, and the object 418 may be included in the group of objects 130. Any such signals may be provided to the perception system 322 and/or other components of the vehicle computing device 304. In some examples, the perception system 322 may identify the object 418 based at least in part on the one or more signals generated by the LIDAR sensor 404, and may determine whether the object 122 described above is absent from or misclassified in one or more of the groups of objects 128, 130, 132 (e.g., absent from or misclassified in the group of objects 130 corresponding to the LIDAR sensor data 112) based at least in part on identifying the object 418 included in the group of objects 130.

In further embodiments in which the sensor 406 comprises a camera or other image capture device (e.g., an image capture device 102), the sensor 406 may be configured to generate a signal including image data 110 indicating a group of objects 128 detectable in an environment (e.g., the environment 108 illustrated in FIG. 1) in which the sensor 406 is present. In some examples, the signal generated by the sensor 406 may comprise a signal (e.g., a first signal) including one or more images captured by the sensor 406 illustrating, indicating, and/or otherwise including the object 418, and the object 418 may be included in the group of objects 128 indicated by the image data 110. In such examples, any signals generated by the sensor 406 may be provided to the perception system 322 and/or other components of the vehicle computing device 304. In some examples, the perception system 322 may identify the object 418 based at least in part on the one or more signals generated by the sensor 406. For instance, the perception system 322 may identify and/or otherwise determine an error associated with data included in one or more of the respective sensor signals. In such examples, the perception system 322 may determine whether the object 122 described above is absent from or misclassified in one or more of the groups of objects 128, 130, 132 (e.g., absent from or misclassified in the group of objects 128 corresponding to the image data 110) based at least in part on identifying the object 418 included in the group of objects 128. It is understood that the perception system 322 may also perform similar processes for signals and/or sensor data 114 received from any of the other sensors (e.g., sensor 106, sensor 402, sensors associated with the sensor system(s) 306, etc.) described herein.

Figure 5:
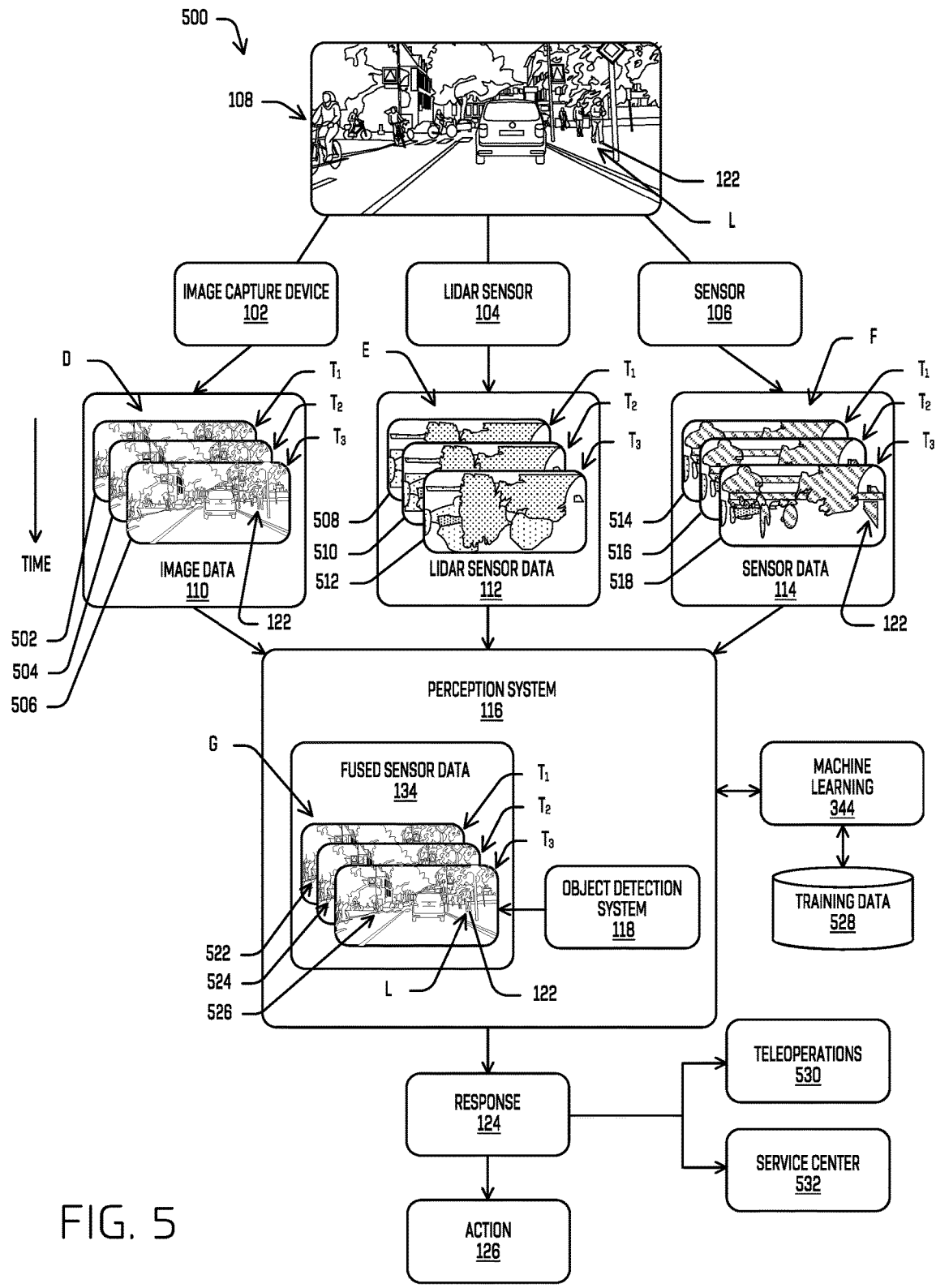
FIG. 5 is a pictorial flow diagram illustrating another example process for identifying an object or a group of objects in an environment, and determining that data received from one or more sensor modalities includes an error associated with the object or the group of objects. Such an example process may include determining that an object is absent from or misclassified in a group of objects associated with data generated by an individual sensor.

FIG. 5 is an example pictorial flow diagram 500 of an example process for comparing individual sensor data with fused sensor data, and initiating a response based at least in part on determining an error associated with data included in one or more of the respective sensor signals (e.g., determining that at least one object included in the fused sensor data is absent from or misclassified in a group of objects associated with data received from an individual sensor). Similar to FIG. 1, sensors, which may include an image capture device 102, a LIDAR sensor 104, and/or another sensor 106, may be coupled to a vehicle travelling through the environment 108. The image capture device 102, LIDAR sensor 104, and sensor 106 capture image data 110, LIDAR sensor data 112, and sensor data 114, respectively, and may communicate such data to the perception system 116. As noted above, a signal from the image capture device 102 may include image data 110, and such image data 110 may represent a scene that includes and/or otherwise indicates a first group of objects 128 (FIG. 1) detectable in the environment 108. Likewise, a signal from the LIDAR sensor 104 may include LIDAR sensor data 112, and such LIDAR sensor data 112 may represent a scene that includes and/or otherwise indicates a second group of objects 130 (FIG. 1) detectable in the environment 108. Further, a signal from the sensor 106 may include sensor data 114, and such sensor data 114 may represent a scene that includes and/or otherwise indicates a third group of objects 132 (FIG. 1) detectable in the environment 108.

As illustrated in FIG. 5, the image capture device 102, LIDAR sensor 104, and sensor 106 may capture such image data 110, LIDAR sensor data 112, and sensor data 114 substantially continuously and/or at regular or irregular time intervals. In such examples the image data 110 captured by the image capture device 102 may indicate, illustrate, and/or represent one or more sequential scenes D. In such examples, each of the sequential scenes D may include respective group of objects 502, 504, 506 detected by the image capture device 102 at different (e.g., sequential) times $T_1$, $T_2$, $T_3$, respectively. Although three sequential scenes D and three corresponding groups of objects 502, 504, 506 are illustrated in FIG. 5, it is understood that greater than or less than three scenes and/or groups of objects may be detected by the image capture device 102, at different (e.g., sequential) respective times or time intervals, during operation. Each group of objects 502, 504, 506 may be similar to and/or the same as the group of objects 128 described above with respect to FIG. 1. In such examples, the image capture device 102 may send the image data 110 to the perception system 116, and the perception system 116 may identify the one or more groups of objects 502, 504, 506 described herein based at least in part on the received image data 110.

Similarly, the LIDAR sensor data 112 captured by the LIDAR sensor 104 may indicate, illustrate, and/or represent one or more sequential scenes E. In such examples, each of the sequential scenes E may include a respective group of objects 508, 510, 512 detected by the LIDAR sensor 104 at different (e.g., sequential) times $T_1$, $T_2$, $T_3$. Although three sequential scenes E and three groups of objects 508, 510, 512 are illustrated in FIG. 5, it is understood that greater than or less than three scenes and/or groups of objects may be detected by the LIDAR sensor 104, at different (e.g., sequential) respective times or time intervals, during operation. Each group of objects 508, 510, 512 may be similar to and/or the same as the group of objects 130 described above with respect to FIG. 1. In such examples, the LIDAR sensor 104 may send the LIDAR sensor data 112 to the perception system 116, and the perception system 116 may identify the one or more groups of objects 508, 510, 512 described herein based at least in part on the received LIDAR sensor data 112.

Further, the sensor data 114 captured by the one or more additional sensors 106 may indicate, illustrate, and/or represent one or more sequential scenes F. In such examples, each of the sequential scenes F may include a respective group of objects 514, 516, 518 detected by the sensor 106 at different (e.g., sequential) times $T_1$, $T_2$, $T_3$. Although three scenes F and groups of objects 514, 516, 518 are illustrated in FIG. 5, it is understood that greater than or less than three scenes and/or groups of objects may be detected by the sensor 106, at different (e.g., sequential) respective times or time intervals, during operation. Each group of objects 514, 516, 518 may be similar to and/or the same as the group of objects 132 described above with respect to FIG. 1. In such examples, the sensor 106 may send the sensor data 114 to the perception system 116, and the perception system 116 may identify the one or more groups of objects 514, 516, 518 described herein based at least in part on the received sensor data 114.

In the process illustrated in FIG. 5, the perception system 116 may be configured to receive signals from the image capture device 102, LIDAR sensor 104, and sensor 106, and such signals may include the image data 110, LIDAR sensor data 112, and sensor data 114 described above with respect to FIG. 5. In the example shown, the perception system 116 may be configured to determine, based at least in part on the one or more signals, corresponding groups of objects 522, 524, 526. For example, the perception system 116 may be configured to generate, identify, define, and/or otherwise determine a group of objects 522, present in the environment 108 at time $T_1$, based at least in part on the groups of objects 502, 508, 514 corresponding to time $T_1$. The perception system 116 may also determine a group of objects 524, present in the environment 108 at time $T_2$, based at least in part on the groups of objects 504, 510, 516 corresponding to time $T_2$, and may determine a group of objects 526, present in the environment 108 at time $T_3$, based at least in part on the groups of objects 506, 512, 518 corresponding to time $T_3$. In such examples, the groups of objects 522, 524, 526 determined by the perception system 116 through the use of image data 110, LIDAR sensor data 112, and sensor data 114 may be considered, individually or collectively, fused sensor data 134. Further, the perception system 116 may use any of the data association, object recognition, data characterization, and/or other techniques described herein to determine which objects of the respective groups of objects 522, 524, 526 are the same.

In such examples, the perception system 116 may also be configured to identify one or more objects 122 and/or to determine one or more groups of objects 522, 524, 526 using and/or otherwise based at least in part on sensor data collected at later times. For example, the groups of objects 504, 510, 516 associated with the time $T_2$ (e.g., observed at a time later than the time $T_1$ associated with the groups of objects 502, 508, 514) and/or the groups of objects 506, 512, 518 associated with the time $T_3$ (e.g., observed a time later than the time $T_1$ associated with the groups of objects 502, 508, 514) may be used by the perception system 116 and/or the object detection system 118 to determine the group of objects 522 indicated by the perception system 116 as being present in the environment 108 at time $T_1$. The perception system 116 and/or the object detection system 118 may also identify and/or otherwise determine an error associated with a group of objects observed at a first time (e.g., the time $T_1$) based at least in part on sensor data and/or groups of objects observed at a second time (e.g., the time $T_2$) later than the first time. For example, the perception system 116 and/or the object detection system 118 may identify a particular object as being included in such fused sensor data 134, but being absent from or misclassified in one or more groups of objects (e.g., group of objects 508 observed at time $T_1$) based at least in part on the groups of objects 504, 510, 516 observed at the time $T_2$ and/or the groups of objects 506, 512, 518 observed at the time $T_3$. Such later-observed (e.g., future) sensor data, and corresponding groups of objects, may provide a high level of confidence when generating fused sensor data 134 comprising one or more groups of objects 522 indicated by the perception system 116 as being present in the environment 108 at time $T_1$ and/or when identifying one or more objects 122 present in the environment 108 at time $T_1$. Such later-observed (e.g., future) sensor data, and corresponding groups of objects, may also be used as log data to train various sensor modalities in, for example, offline machine learning processes.

In some examples, the perception system 116 may provide any of the image data 110, LIDAR sensor data 112, sensor data 114, the fused sensor data 134 (e.g., one or more of the groups of objects 522, 524, 526), and/or other outputs of the perception system 116 to a machine learning system 344 (e.g., a convolutional neural network (CNN)), such as the machine learning system 344 described above with respect to FIG. 3. For example, the image capture device 102, the LIDAR sensor 104, and/or the sensor 106 may communicate one or more signals including data representing respective sequential scenes associated with the environment 108 to the perception system 116. The perception system 116 and/or the object detection system 118 may communicate the one or more signals to the machine learning system 344 so that the data may be segmented using the machine learning system 344 (e.g., the image data 110 may be segmented). In such examples, any of the signals or information provided to the machine learning system 34 may be used as ground truth for training the machine learning system 344. The same, or similar, algorithms may be used to segment any one or more of the other sensor modalities. In some examples, the machine learning system 344 may, either alone or in combination with the object detection system 118 or other components of the perception system 116, execute a segmentation model or other component trained to segment the data and/or classify objects in the data. In some examples, based at least in part on the segmentation, and/or any of the data association, object recognition, data characterization, and/or other processes described herein, the machine learning system 344 may be configured to identify an object 122 that is included in fused sensor data 134 (e.g., that is included in one or more of the groups of objects 522, 524, 526) but that is absent from or misclassified in at least one of the groups of objects 502-518 by identifying at least one data segment that is inconsistent with other data segments. In some examples, identification of the object 122 in this way may be confirmed or discounted, for example, according to other methods described herein. For instance, as noted above, later-observed (e.g., future) sensor data, and corresponding groups of objects may be used by the machine learning system 344 to confirm the identification of the object 122, to confirm a location of the object 122, and/or to confirm any other parameter associated with the object 122. Further, as noted above, the present disclosure is not limited to identifying one or more objects 122 that are absent from or misclassified in one or more such scenes. Instead, additional example processes may include determining one or more additional and/or different errors associated with data included in one or more of the respective sensor signals.

The machine learning system 344 may include any type of machine learning system described herein. For example, the machine learning system 344 may be a CNN. In some examples, the machine learning system 312 may include more than one machine learning system. As explained herein, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

To produce a valid output, a machine learning system 344, such as, for example, a CNN, must first learn a set of parameters, or be "trained." Training is accomplished by inputting training data 528 into the machine learning system 344, the training data 528 being associated with expected output values. These expected output values may generally be referred to as "ground truth." For example, a ground truth may include an identification of specific objects in an image, as well as a semantic classification or label associated with the object (e.g., identifying and labeling an object as a car or a building). The accuracy of a machine learning system 344 may be based on the amount and/or accuracy of data provided in the training data 528. As a result, an appropriate dataset to train a machine learning system 344 to output segmented sensor data would include sensor data having known, or previously determined, segments. In some examples, training data 528 may include one or more segmented images representative of real-world scenes correlated with one or more sensor datasets representative of real-world scenes, which may be annotated by hand or via one or more algorithms configured to segment, detect, classify, and/or label objects in the sensor datasets. In some examples, a training data 528 may include synthetic (e.g., computer generated) data that include annotated objects or that has been annotated by a computer algorithm. Training can be performed using offline and/or online data, and as noted above, later-observed (e.g., future) sensor data, and corresponding groups of objects may be used for such training and/or machine learning exercises. In any of the examples described herein, the fused sensor data 134 may be provided to the machine learning system 344 and/or may be used as training data 528. Additionally, one or more signals including image data 110, LIDAR sensor data 112, and/or sensor data 114 may be provided to the machine learning system 344 and/or may be used as training data 528.

In examples in which training (e.g., machine learning), object classification, and/or other processes are performed online (e.g., using the vehicle computing device 304 and/or other components of the vehicle 302), the capacity of the memory 318, speed/power of the processor(s) 316 and/or other parameters of the vehicle computing device 304 may limit the speed at which such processes are performed, and may also limit the sophistication of the neural networks, algorithms, and/or other components used. In examples in which training (e.g., machine learning), object classification, and/or other processes are performed offline (e.g., using the processor(s) 336 and/or other components of the remote computing devices 334), the capacity of the memory 338 may be greater than the capacity of the memory 318. Likewise, the speed/power of the processor(s) 336 and/or other parameters of the remote computing device 334 may be greater than the corresponding speed/power of the processor(s) 316. As a result, relatively more sophisticated neural networks, algorithms, and/or other components may be used in offline processes. Moreover, due to the relative robustness of such offline systems, in any of the examples described herein, an offline three-dimensional perception pipeline associated with the remote computing devices 334 may be utilized to train the online sensors of, for example, the vehicle 302.

Moreover, in some examples such offline machine learning techniques may include the use of data acquired later in time to make determinations and/or predictions about the past location of objects and/or about the identification/classification of objects. For example, it is understood that log data and/or other historical data may be stored in the sensor data store 340. Such log data may include, for example, information indicating the sensed location of a particular object at various points in time, the characterization and/or identification of such an object, etc. In some examples, such historical data may be used in various forward and backward looping processes to assist in training one or more sensors of the vehicle 302. For example, such historical data may be used to confirm predictions made during the data association and/or object tracking processes of the present disclosure. As a result, using historical data to assist in training one or more sensor pipelines of the vehicle 302 during offline machine learning exercises may improve the accuracy of the online determinations made by the perception system 322 and/or other components of the vehicle computing device 304.

Loss functions may be used to adjust internal parameters of the machine learning system 344 during training. The loss functions are functions of the expected output (or ground truth) values for the training data 528 and values output by the network. Information contained in loss functions may be sent through the machine learning system 344 as back propagations to adjust internal parameters, thereby tuning the machine learning system 344 to provide valid outputs. All else being equal, the more training data 528 used to train a machine learning system 344, the more reliable the machine learning system 344 may be (e.g., in providing accurate segmentations and/or classifications).

Such a loss function may include, for example, support vector machine (SVM) loss, hinge loss, etc. Such a loss function may be used to train a machine learning system 344 to segment sensor data, though any other function of input data with expected, or ground truth, segmented data is contemplated.

In any of the above referenced examples, one sensor modality may inform any other sensor modality. As a non-limiting example, LIDAR sensor data 112 may indicate an object (whether static or dynamic) in the environment 108 proximate to the vehicle as may be determined based on, for example, LIDAR feature tracking, LIDAR segmentation, LIDAR classification, and the like. In such examples, objects determined in the LIDAR sensor data 112 may be used to determine an expected sensor return in the remaining sensor modalities (e.g. in other LIDAR sensors, in image data 110, or sensor data 114). Discrepancies between expected object detections and measurements of the data may indicate failure of a respective sensor, miscalibration of a respective sensor, and the like. In any of the examples described herein, one or more of the signals and/or the corresponding image data 110, LIDAR sensor data 112, and/or sensor data 114 may be input into the machine learning system 344, and the response system 124 may initiate a corresponding response and/or other action 126 based at least in part on an output of the machine learning system 344. It is understood that the machine learning system 344 and/or the training data 528 may be configured and/or utilized to train the image capture device 102, the LIDAR sensor 104, the sensor 106, and/or any of the other sensor modalities described herein.

With continued reference to FIG. 5, in some examples confidence levels may be associated with the identification of an object 122, and in such examples, the response system 124 may be configured to initiate the response and/or any other action 126 when a confidence level associated with the identification of the object 122 falls below a threshold confidence level. For example, a response and/or any other action 126 such as one or more of those described herein may be used to account for inaccuracies associated with the image data 110, the LIDAR sensor data 112, and/or the sensor data 114, and may improve the operability of the vehicle 202.

In some examples, the perception system 116 may be coupled to a vehicle (e.g., either physically or via a communications system), and initiating the response and/or any other action 126 may include one or more of initiating communication, for example, via the communication connection(s) 310 (FIG. 3), with a teleoperations system 530 configured to assist with operation of the vehicle, or generating a verification request. In some examples, generating such a verification request may include initiating notification of a vehicle service center 532 regarding the obstruction absence of one or more identified objects 122. For example, the vehicle may be configured to operate according to an assisted mode, wherein the teleoperations system 530, which may be located remotely from the vehicle, may receive one or more signals from the vehicle (e.g., via the communication connection(s) 310 and/or a related communications network) relating to its operation. For example, the teleoperations system 530 may be configured to verify the presence or absence of the object 122 in the environment 108 based on the one or more signals received from the vehicle, for example, via a teleoperator and/or one or more of the methods described herein. The teleoperations system 530 may be configured to send one or more signals to the vehicle causing the vehicle to initiate a response and/or any other action 126 account for the inaccuracies associated with the image data 110, the LIDAR sensor data 112, and/or the sensor data 114 as described herein. As non-limiting examples, such teleoperator actions may comprise sending a command to have the vehicle stop, adjusting weights assigned to various sensor modalities, send a command to resolve and/or mitigate the error, and the like.

As noted above, in some examples initiating the response and/or other action 126 may include reversing a direction of travel of the vehicle, for example, by communication with the drive module(s) 314 (FIG. 3). In some examples, the vehicle may be a bi-directional vehicle configured to operate generally with equal performance in either a first direction or a second opposite direction, for example, as described herein. In such examples, the vehicle may have at least similar sensors at both ends of the vehicle, and the drive module(s) 314 may be configured to cause the vehicle to operate in the opposite direction of travel if the perception system 116 and/or the object detection system 118 identifies an object 122 as being present in the environment 108, and determines a corresponding error associated with data included in one or more of the respective sensor signals received by the perception system 116 (e.g., determining that the identified object 122 is absent from or misclassified in one or more of the groups of objects noted above).

Moreover, as noted above, such a response and/or other action 126 may include, among other things, at least one of ignoring a portion of the image data 110, the LIDAR sensor data 112, and/or the sensor data 114. Such a response and/or other action 126 may also include modifying a weight, confidence value, and/or other metric associated with one or more of the image capture device 102, the LIDAR sensor 104, the one or more additional sensors 106, other sensors of the sensor system(s) 306 (FIG. 3), and/or signals received from the respective sensors of the sensor system(s) 306. Such a response and/or other action 126 may further include modifying the training data 528 described above.

Further, in any of the examples described herein, the perception system 116, object detection system 118, machine learning system 344, and/or other systems of the present disclosure may be configured to compare the various groups of objects described above to one another, and may initiate a response and/or other action 126 based at least in part on such a comparison. For example, the perception system 116 may be configured to compare the groups of objects 502, 508, 514, and/or other groups of objects associated with sensor data collected at time $T_1$, to one another. The object detection system 118 of the perception system 116 may be configured to, for example, determine whether any differences exist between the groups of objects 502, 508, 514, and/or between any parameters associated with the groups of objects 502, 508, 514. For example, the object detection system 118 may be configured to determine that one or more object included in the group of objects 502 is absent from the group of objects 508 and/or the group of objects 514 (e.g., a false negative). In further examples, the object detection system 118 may be configured to determine that one or more object included in the group of objects 502 is different from a corresponding object included in the group of objects 508 and/or the group of objects 514 (e.g., a false positive or misclassification). In such examples, the response system 124 may initiate a response and/or any other action based at least in part on such a determination. Further, it is understood that the perception system 116 may be configured to compare the groups of objects 504, 510, 516, and/or other groups of objects collected at time $T_2$, to one another, and so on. In any of the examples described herein, comparing groups of objects (e.g., groups of objects 502, 508, 514) to one another, and/or comparing any of the respective groups of objects (e.g., groups of objects 502, 508, 514) to fused sensor data 134 may include associating the individual objects included in the respective groups of objects with one another for comparison purposes. In some examples, such "object association" processes may include projecting data or objects from one sensor dataset into the other. As a non-limiting example, data indicative of the group of objects 502 included in the image data 110 may be projected into (or otherwise associated with) LIDAR sensor data 112 including the group of objects 508, and/or into the sensor data 114 including the group of objects 514 to determine objects in the groups which correspond to the same object in the environment. Additionally, or alternatively, at least a portion of the fused sensor data 134 (e.g., one or more objects included in the group of objects 522) may be associated with a portion of the image data 110, a portion of the LIDAR sensor data 112, and/or a portion of the sensor data 114 to determine which objects in the group of objects 522 detected in the fused sensor data 134 correspond to objects in group of objects 502, 508, and/or 514. For example, as part of such an object association process the perception system 116 may project (or otherwise associated) one or more objects included in the group of objects 522 into the scenes D, E, and/or F to determine which, if any, objects in the group of objects 522 correspond to objects in any of groups of objects 502, 508, 514. Alternatively, one or more objects included in and/or identified in the respective groups of objects 502, 508, 514 may be projected into the fused sensor data 134 (e.g., the group of objects 522). Such object association processes may be performed by the perception system 116 using one or more data alignment, feature matching, and/or other data mapping techniques. In any such object association processes, the perception system 116 may correlate an output of each sensor modality to a particular object and/or to a respective location. As a result, individual outputs of the respective sensor modalities can be compared with fidelity. In some examples, any of the object association processes described above may be performed by the perception system 116 as part of one or more of the data association, object recognition, object characterization, and/or other processes described herein.

Figure 6:
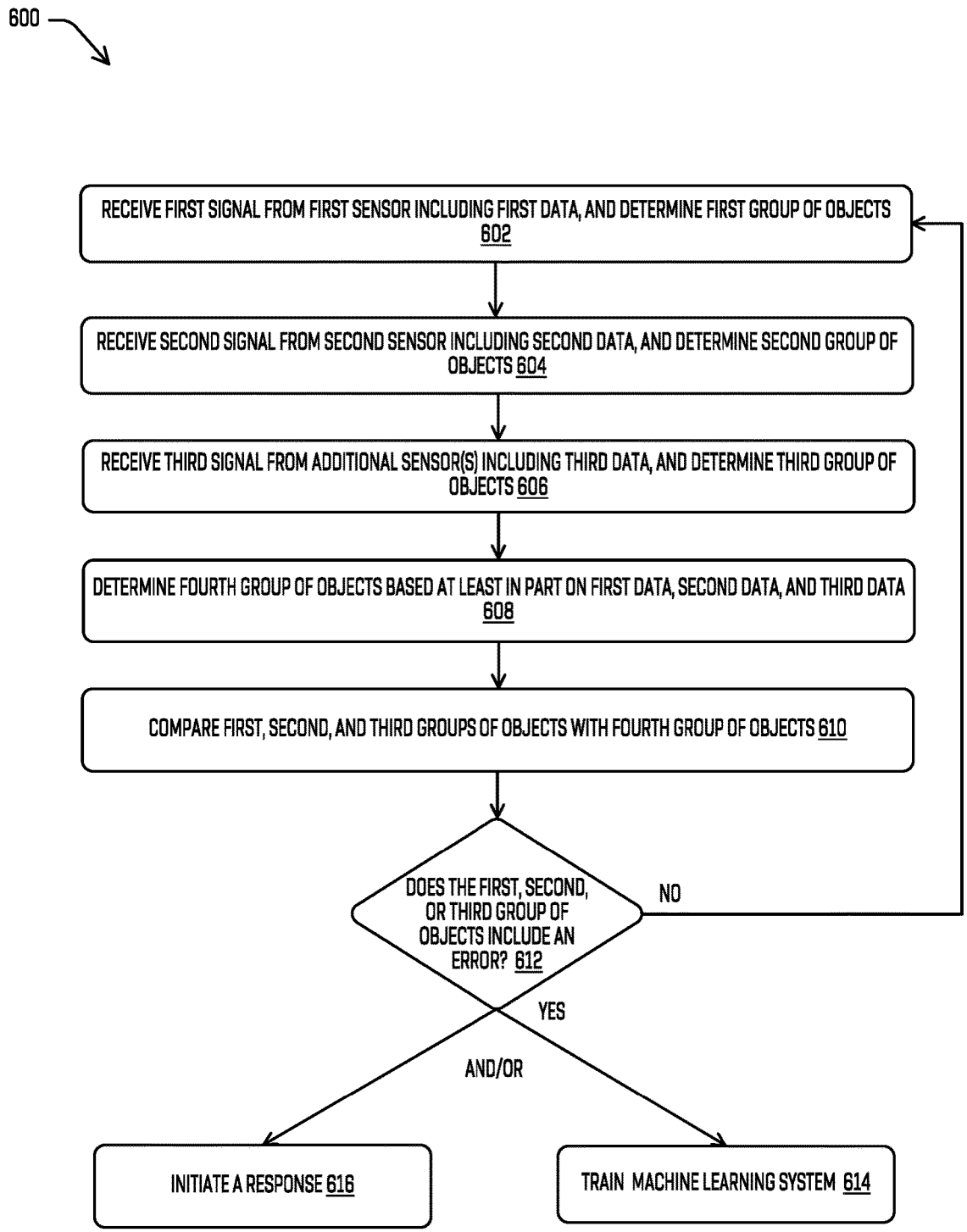
FIG. 6 is a flowchart illustrating an example process for identifying an object detectable in an environment, and initiating a response.

FIG. 6 is a flow diagram of an example process 600 illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

In some examples, the process 600 of FIG. 6 may be employed to compare individual sensor data to fused sensor data, and to identify and/or otherwise determine an error associated with data included in one or more of the respective sensor signals received by the perception system 116 (e.g., determine a particular object that is present in the fused sensor data but that is absent from or misclassified in one or more groups of objects associated with various sensor signals). Such a process 600 may also include initiating a response or other action based at least partly on determining such an error exists (e.g., based at least partly on identifying such an object). Additionally or alternatively, such a process 600 may include training a machine learning system based at least partly on determining such an error exists. Any of the steps associated with the process 600 may be performed online (e.g., by one or more processors 316 disposed on a vehicle 302) and/or offline (e.g., by one or more remote computing devices 334). At 602, the example process 600 may include receiving, with one or more processor(s) 316 and/or other components of a vehicle computing device 304 and/or a remote computing device 334 (e.g., one or more server computers or other remote computing devices), a first signal from a first sensor. In such examples, the first sensor may comprise, among other things, one or more image capture devices 102, and/or one or more other sensors described herein with respect to the sensor system(s) 306. Additionally, such a first sensor may be disposed on and/or otherwise connected to a vehicle 302. In some examples, the vehicle 302 may comprise an autonomous vehicle, a semi-autonomous vehicle, and/or any other vehicle known in the art. The first signal received at 602 may include first data (e.g., image data 110) and/or other data representing the environment 108. For example, image data 110 received at 602 may represent a first scene A detected by the image capture device 102. As noted above with respect to at least FIG. 1, in some examples, such a first scene A may include a first group of objects 128 detectable in the environment 108 in which the first sensor is present. In particular, the first scene A may include a first group of objects 128 actually detected by the first sensor (e.g., the image capture device 102) in the environment 108. In any of the examples described herein, at 602 the one or more processor(s) 316 and/or other components of the vehicle computing device 304 and/or the remote computing device 334 may determine the first group of objects 128 based at least in part on the first data (e.g., the image data 110) using one or more segmentation, classification, and/or other data analysis process.

At 604, the example process 600 may include receiving, with one or more processor(s) 316 and/or other components of the vehicle computing device 304 and/or the remote computing device 334, a second signal from a second sensor (e.g., the LIDAR sensor 104) disposed on the vehicle 302. In such examples, the second signal received at 604 may include second data (e.g., LIDAR sensor data 112) and/or other data representing the environment 108. For example, LIDAR sensor data 112 received at 604 may represent a second scene B detected by the LIDAR sensor 112. In some examples, the second scene B may be detected by the second sensor at the same time (e.g., substantially simultaneously) as the first scene A is detected by the first sensor. Additionally, as described above with respect to FIG. 1, the second scene B may include a second group of objects 130 detectable in the environment 108. In particular, the scene B may include a second group of objects 130 actually detected by the second sensor (e.g., the LIDAR sensor 104) in the environment 108. In examples in which the scene B is detected by the second sensor at the same time as the scene A is detected by the first sensor, the first group of objects 128 may be substantially the same as the second group of objects 130. In any of the examples described herein, at 604 the one or more processor(s) 316 and/or other components of the vehicle computing device 304 and/or the remote computing device 334 may determine the second group of objects 130 based at least in part on the second data (e.g., the LIDAR sensor data 112) using one or more segmentation, classification, and/or other data analysis process.

In further examples, at 606 the example process 600 may include receiving, with one or more processor(s) 316 and/or other components of the vehicle computing device 304 and/or the remote computing device 334, a third signal from one or more additional sensors 106 (e.g., a RADAR sensor) disposed on the vehicle 302. In such examples, the third signal received at 606 may include third data (e.g., sensor data 114) and/or other data representing the environment 108. For example, sensor data 114 (e.g., RADAR sensor data) received at 606 may represent a third scene C detected by the one or more additional sensors 106 (e.g., by a RADAR sensor). The third scene C may be detected by the one or more additional sensors 106 at the same time (e.g., substantially simultaneously) as the first scene A is detected by the first sensor and/or the second scene B is detected by the second sensor. Additionally, as described with respect to FIG. 1, the third scene C may include a third group of objects 132 detectable in the environment 108. In particular, the scene C may include a third group of objects 132 actually detected by the one or more additional sensors 106 in the environment 108. In examples in which the scene C is detected by the one or more additional sensors 106 at the same time as the scene A is detected by the first sensor, the third group of objects 132 may be substantially the same as the first group of objects 128, or, at have at least some data in common (e.g. by having overlapping fields of view). In examples in which the scene C is detected by the one or more additional sensors 106 at the same time as the scene B is detected by the second sensor, the third group of objects 132 may be substantially the same as the second group of objects 130, or, at have at least some data in common (e.g. by having overlapping fields of view). In any of the examples described herein, at 606 the one or more processor(s) 316 and/or other components of the vehicle computing device 304 and/or the remote computing device 334 may determine the third group of objects 132 based at least in part on the third data (e.g., the sensor data 114) using one or more segmentation, classification, and/or other data analysis process.

At 608 the perception system 116 may determine a fourth group of objects 120 based at least in part on the first data (e.g., the image data 110) received at 602, the second data (e.g., the LIDAR sensor data 112) received at 604, and/or the third data (e.g., the sensor data 114) received at 606. For example, at 608 the perception system 116 may generate and/or otherwise determine fused sensor data 134 predicted, determined, and/or indicated by the perception system 116 as being present within the environment 108. The perception system 116 may generate such fused sensor data 134 at 608 using any of the fusion techniques described herein and based at least in part on the information included in the one or more of the signals received at 602, 604, and/or 606. For example, the perception system 116 may generate such fused sensor data 134 based at least in part on received image data 110, received LIDAR sensor data 112, and/or received sensor data 114, and the fused sensor data 134 generated at 608 may comprise the fourth group of objects 120 described above. In such examples, the group of objects 120 (e.g., the fused sensor data 134) may comprise objects predicted, determined, and/or indicated by the perception system 116 as being present within the environment 108. As described herein, such fused sensor data 134 may be used by the perception system 116 and/or by the machine learning system 344 as ground truth information for training individual sensor modalities.

At 610 the perception system 116 may compare the first data (e.g., the image data 110) received at 602, the second data (e.g., the LIDAR sensor data 112) received at 604, the third data (e.g., the sensor data 114) received at 606, and/or any other data included in the one or more of the signals received at 602, 604, and/or 606 to the fused sensor data 134 generated at 608 in order to determine whether any discrepancies exist between the fused sensor data 134 and the data received from the individual sensor modalities. For example, at 610, the perception system 116 may compare the first group of objects 128, the second group of objects 130, and the third group of objects 132 to the fourth group of objects 120 determined at 608 to determine whether one or more errors exist in the respective groups of objects 128, 130, 132. In such comparisons, the fourth group of objects 120 may be treated as ground truth since the fourth group of objects 120 was generated using data (e.g., image data 110, LIDAR sensor data 112, sensor data 114, etc.) from multiple sources (e.g., the image capture device 102, the LIDAR sensor 104, the one or more additional sensors 106, etc.).

At 612, one or more processor(s) 316 and/or other components of the vehicle computing device 304 and/or the remote computing device 334 may determine whether the first group of objects 128, the second group of objects 130, and/or the third group of objects 132 includes an error relative to the group of objects 120 (e.g., relative to the assumed ground truth). For example, at 612 one or more processor(s) 316 and/or other components of the vehicle computing device 304 may determine whether one or more objects 122 included in the fusion sensor data 134 (e.g., one or more objects 122 included in the group of objects 120) are absent from or misclassified in at least one of the groups of objects 128, 130, 132 corresponding to the signals received at 602, 604, 606, respectively. In some examples, at 612 the object detection system 118 and/or the perception system 116 may be configured to determine that one or more objects (e.g., the object 122) included in the group of objects 120 is absent from at least one of the groups of objects 128, 130, 132 (e.g., a false negative associated with at least one of the groups of objects 128, 130, 132). In further examples, at 610 the object detection system 118 and/or the perception system 116 may be configured to determine that one or more objects (e.g., the object 122) included in the group of objects 120 is different from a corresponding object included in at least one of the groups of objects 128, 130, 132 (e.g., a false positive or misclassification associated with an object in at least one of the groups of objects 128, 130, 132). In still further examples, at 610 the object detection system 118 and/or the perception system may be configured to determine and/or identify any of the other errors described herein. In any such examples, the object detection system 118 and/or the perception system 116 may determine at 612 that, "Yes," an error exists. For example, the perception system 116 may determine at 612 that, "Yes," an object (e.g., the object 122) included in the fused sensor data 134 (e.g., included in the group of objects 120) is absent from or misclassified in at least one of the groups of objects 128, 130, 132, and the system may proceed to 614 and/or to 616. Alternatively, the object detection system 118 and/or the perception system 116 may determines at 612 that, "No," an error does not exist. For example, the perception system 116 may determine at 612 that, "No," none of the objects included in the fused sensor data 134 (e.g., included in the group of objects 120) are absent from or misclassified in the groups of objects 128, 130, 132 (e.g., the objects identified in the groups of objects 128, 130, 132 are each included in the group of objects 120). In such examples, the system may proceed to 602.

At 614, one or more processor(s) 316 and/or other components of the vehicle computing device 304 and/or the remote computing device 334 may use information included in one or more of the signals received at 602, 604, and/or 606 as ground truth in training the machine learning system 344 described above. For example, at 614 the perception system 116 may identify which of the signals received at 602, 604, 606 corresponds to the determined error, and/or which of such signals includes information that may be useful for training the machine learning system 344. Such information may be used as a ground truth example for training the machine leaning system 344 at 614. In some examples, the machine learning system 344 may, either alone or in combination with the object detection system 118 or other components of the perception system 116, identify, classify, and/or categorize all objects detected in a scene (such as one or more of the scenes A-G described above), and may identify one or more objects 122 that are absent from or misclassified in one or more such scenes. In some examples, the processes associated with 614 may be performed offline or online.

At 616, one or more processor(s) 316 and/or other components of the vehicle computing device 304 and/or the remote computing device 334 may initiate or response, and/or any other action 126 based at least in part on determining an error at 612. For example, at 616 one or more processor(s) 316 and/or other components of the vehicle computing device 304 may determine that the object 122 identified at 612 is absent from or misclassified in at least one of the groups of objects 128, 130, 132. For example, at 612 perception system 116 may determine that the object 122 is absent from the group of objects 130, and that the object 122 is included in the group of objects 128 and the group of objects 132. Based at least in part on such a determination, the response system 124 may, at 616, initiate any of the responses described above. For example, such responses may include, among other things, at least one of ignoring a portion of the image data 110, the LIDAR sensor data 112, and/or the sensor data 114. Such a response and/or other action 126 initiated at 616 may also include modifying a weight, confidence value, and/or other metric associated with one or more of the image capture device 102, the LIDAR sensor 104, the one or more additional sensors 106, other sensors of the sensor system(s) 306, and/or signals received from the respective sensors of the sensor system(s) 306. Such a response and/or other action 126 initiated at 616 may further include modifying training data 528 associated with one or more of the image capture device 102, the LIDAR sensor 104, the one or more additional sensors 106, other sensors of the sensor system(s) 306. In some examples, such a response and/or other action 126 initiated at 616 may also include generating a verification request and/or sending, using the communication connection(s) 310, such a verification request to a service center 532 and/or teleoperations system 530 for consideration by a human operator and/or teleoperator. Such a response and/or other action 126 initiated at 616 may also include controlling one or more of the drive module(s) 314 to change a speed, direction, and/or other operating parameter of the vehicle 302. In some examples, the processes associated with 616 may be performed offline or online.

As noted above, the method 600 is illustrated as collections of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the method 600 may be combined, in whole or in part, with other methods.

Figure 7:
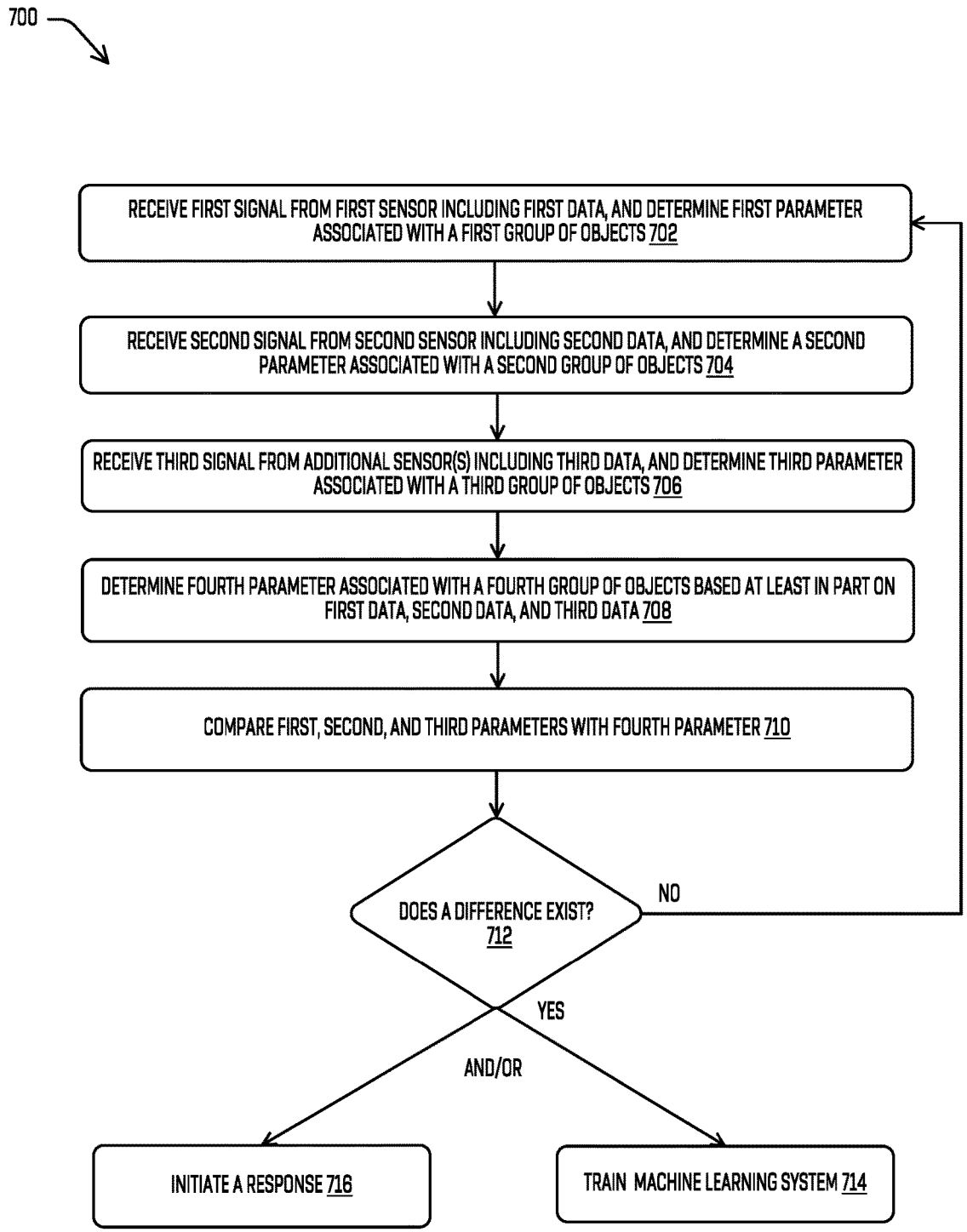
FIG. 7 is a flowchart illustrating another example process for identifying an object detectable in an environment, and initiating a response.

FIG. 7 is a flow diagram of another example process 700 illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The process 700 may, in some respects, be substantially similar to and/or the same as the process 600 described above with respect to FIG. 6. Where possible, like item numerals will be used below to describe aspects of the process 700 that are substantially similar to and/or the same as corresponding aspects of the process 600.

In some examples, the process 700 of FIG. 7 may be employed to determine parameters associated with respective groups of objects associated with sensor data. The process 700 may include comparing various parameters to determine whether one or more differences exist between such parameters. Such a process 700 may further include initiating a response or other action based at least partly on determining such a difference exists. Additionally or alternatively, such a process 700 may include training a machine learning system based at least partly on determining such a difference exists. Any of the steps associated with the process 700 may be performed online (e.g., by one or more processors 316 disposed on a vehicle 302) and/or offline (e.g., by one or more remote computing devices 334).

At 702, the example process 700 may include receiving, with one or more processor(s) 316 and/or other components of a vehicle computing device 304 and/or a remote computing device 334 (e.g., one or more server computers or other remote computing devices), a first signal from a first sensor. In such examples, the first sensor may comprise, among other things, one or more image capture devices 102, and/or one or more other sensors described herein with respect to the sensor system(s) 306. Additionally, such a first sensor may be disposed on and/or otherwise connected to a vehicle 302. In some examples, the vehicle 302 may comprise an autonomous vehicle, a semi-autonomous vehicle, and/or any other vehicle known in the art. The first signal received at 702 may include first data (e.g., image data 110) and/or other data representing the environment 108. For example, image data 110 received at 702 may represent a first scene A detected by the image capture device 102. In any of the examples described herein, at 702 the one or more processor(s) 316 and/or other components of the vehicle computing device 304 and/or the remote computing device 334 may determine the first group of objects 128 based at least in part on the first data (e.g., the image data 110) using one or more detection, segmentation, classification, and/or other data analysis process.

Further, at 702 the one or more processor(s) 316 and/or other components of the vehicle computing device 304 and/or the remote computing device 334 may determine one or more parameters (e.g., a first parameter) associated with the first group of objects 128 using the first data. In any of the examples described herein, such a parameter may comprise, among other things, a classification of an object in the environment 108, a determination of the existence and/or presence of an object in the environment 108 (i.e. a detection), a location (e.g., location L) of an object in the environment 108, an orientation of an object, a number of objects, an uncertainty, and/or any other characteristic, metric, or aspect of such an object.

At 704, the example process 700 may include receiving, with one or more processor(s) 316 and/or other components of the vehicle computing device 304 and/or the remote computing device 334, a second signal from a second sensor (e.g., the LIDAR sensor 104, or any other sensor of the sensor system(s) 306 disposed on the vehicle 302. In such examples, the second signal received at 704 may include second data (e.g., LIDAR sensor data 112) and/or other data representing the environment 108. For example, LIDAR sensor data 112 received at 704 may represent a second scene B detected by the LIDAR sensor 112. As described above with respect to FIG. 1, the second scene B may include a second group of objects 130 detectable in the environment 108. In particular, the scene B may include a second group of objects 130 actually detected by the second sensor (e.g., the LIDAR sensor 104) in the environment 108. In examples in which the scene B is detected by the second sensor at the same time as the scene A is detected by the first sensor, at least one of the first group of objects 128 may be substantially the same as at least one of the second group of objects 130. In any of the examples described herein, at 704 the one or more processor(s) 316 and/or other components of the vehicle computing device 304 and/or the remote computing device 334 may determine the second group of objects 130 based at least in part on the second data (e.g., the LIDAR sensor data 112) using one or more detection, segmentation, classification, and/or other data analysis process. Further, at 704 the one or more processor(s) 316 and/or other components of the vehicle computing device 304 and/or the remote computing device 334 may determine one or more parameters (e.g., a second parameter) associated with the second group of objects 130 using the second data. In any of the examples described herein, such a parameter may comprise any of the parameters described above with respect to 702.

In further examples, at 706 the example process 700 may include receiving, with one or more processor(s) 316 and/or other components of the vehicle computing device 304 and/or the remote computing device 334, a third signal from one or more additional sensors 106 (e.g., a RADAR sensor, or any other sensor of the sensor system(s) 306) disposed on the vehicle 302. In such examples, the third signal received at 706 may include third data (e.g., sensor data 114) and/or other data representing the environment 108. For example, sensor data 114 (e.g., RADAR sensor data) received at 706 may represent a third scene C detected by the one or more additional sensors 106 (e.g., by a RADAR sensor). As described with respect to FIG. 1, the third scene C may include a third group of objects 132 detectable in the environment 108. In particular, the scene C may include a third group of objects 132 actually detected by the one or more additional sensors 106 in the environment 108. In any of the examples described herein, at 706 the one or more processor(s) 316 and/or other components of the vehicle computing device 304 and/or the remote computing device 334 may determine the third group of objects 132 based at least in part on the third data (e.g., the sensor data 114) using one or more detection, segmentation, classification, and/or other data analysis process. Further, at 706 the one or more processor(s) 316 and/or other components of the vehicle computing device 304 and/or the remote computing device 334 may determine one or more parameters (e.g., a third parameter) associated with the third group of objects 132. In any of the examples described herein, such a parameter may comprise any of the parameters described above with respect to 702.

At 708 the perception system 116 may determine a fourth parameter, associated with a fourth group of objects, based at least in part on the first data (e.g., the image data 110) received at 702, the second data (e.g., the LIDAR sensor data 112) received at 704, and/or the third data (e.g., the sensor data 114) received at 706. For example, at 708 the perception system 116 may generate and/or otherwise determine fused sensor data 134 predicted, determined, and/or indicated by the perception system 116 as being present within the environment 108. The perception system 116 may generate such fused sensor data 134 at 708 using any of the fusion techniques described herein and based at least in part on the information included in the one or more of the signals received at 702, 704, and/or 706. For example, the perception system 116 may generate such fused sensor data 134 based at least in part on received image data 110, received LIDAR sensor data 112, and/or received sensor data 114, and the fused sensor data 134 generated at 708 may comprise a fourth group of objects 120. In such examples, the group of objects 120 (e.g., the fused sensor data 134) may comprise objects predicted, determined, and/or indicated by the perception system 116 as being present within the environment 108. Thus, at 708 the one or more processor(s) 316 and/or other components of the vehicle computing device 304 and/or the remote computing device 334 may determine one or more parameters (e.g., a fourth parameter) associated with the group of objects 120. In any of the examples described herein, such a parameter may comprise any of the parameters described above with respect to 702.

At 710 the perception system 116 may determine one or more corresponding objects between the groups of objects 120, 128, 130, 132. The perception system 116 may then compare the first parameter determined at 702, the second parameter determined at 704, and/or the third parameter determined at 706 with the fourth parameter determined at 708 for corresponding objects (i.e. detected objects which represent the same object in the environment) in order to determine whether any differences in such parameters exist (and/or if such a difference exceeds some threshold). For instance, at 710 the perception system 116 may compare a classification of an object in the environment 108 (including an indication of a certainty of such a classification), a determination of the existence and/or presence of an object in the environment 108 (including uncertainty of such a detection), a location (e.g., location L) of an object in the environment 108 (including uncertainty of such a location), an orientation of an object (including uncertainty of such an uncertainty), a number of objects, an uncertainty, and/or any other first parameter determined 702 to a corresponding parameter of the object determined at 708. At 710, the perception system 116 may also perform similar comparisons between second and third parameters determined at 704 and 706, with a corresponding parameter determined at 708.

In additional examples, at 710 the perception system may compare the first data (e.g., the image data 110) received at 702, the second data (e.g., the LIDAR sensor data 112) received at 704, the third data (e.g., the sensor data 114) received at 706, and/or any other data included in the one or more of the signals received at 702, 704, and/or 706 to the fused sensor data 134 described above in order to determine whether any discrepancies exist between the fused sensor data 134 and the data received from the individual sensor modalities. In such examples, at 710 the perception system 116 may compare the first group of objects 128, the second group of objects 130, and the third group of objects 132 to the fourth group of objects 120 determined at 708 to determine whether any differences exist between the groups of objects 128, 130, 132 and the group of objects 120, and/or to determine whether one or more errors exist in the respective groups of objects 128, 130, 132.

At 712, one or more processor(s) 316 and/or other components of the vehicle computing device 304 and/or the remote computing device 334 may determine whether a difference exists between the parameter determined at 708 and any of the parameters determined at 702, 704, and 706 (and/or if the difference exceeds some threshold). For instance, in examples in which the first parameter determined at 702 comprises a first classification of an object 122 in the environment 108, the second parameter determined at 704 comprises a second classification of the object 122, the third parameter determined at 706 comprises a third classification of the object 122, and the fourth parameter determined at 708 comprises a fourth classification of the object 122, such a difference identified at 712 may comprise a difference between the first, second, or third classification, and the fourth classification and/or a difference in uncertainty of such a classification determination. Similarly, in examples in which the first parameter determined at 702 comprises a first determination of the existence of the object 122 in the environment 108, the second parameter determined at 704 comprises a second determination of the existence of the object 122, the third parameter determined at 706 comprises a third determination of the existence of the object 122, and the fourth parameter determined at 708 comprises a fourth determination of the existence of the object 122, such a difference identified at 712 may comprise a difference between the first, second, or third determination, and the fourth determination and/or the uncertainties associated with such a determination. In any of the examples described herein, one or more parameter differences identified at 712 may be determined based at least in part on data collected, by the image capture device 102, the LIDAR sensor 104, the one or more additional sensors 106, and/or any other sensors of the present disclosure at a point in time that is later than a particular time at which, for example, the first data associated with the first signal received at 702, the second data associated with the second signal received at 704 and/or the third data associated with the signal received at 706 is collected. For example, in some embodiments the first group of objects 128 indicated by the image data 110 included in the first signal may be detected by the image capture device 102 at a first time ti. In such embodiments the second group of objects 130 indicated by the LIDAR sensor data 112 included in the second signal may be detected by the LIDAR sensor 104 at the first time $T_1$. In such examples, a parameter difference may be identified at 712 based at least in part on additional image data 110 and/or additional LIDAR sensor data 112 detected at a second time $T_2$ later than the first time $T_1$.

In still further examples, at 712 one or more processor(s) 316 and/or other components of the vehicle computing device 304 may determine whether a parameter difference exists by determining whether one or more objects 122 included in the fusion sensor data 134 (e.g., one or more objects 122 included in the group of objects 120) are absent from or misclassified in at least one of the groups of objects 128, 130, 132 corresponding to the signals received at 702, 704, 706, respectively. In still further examples, it is understood that two or more of the groups of objects 128, 130, 132 described herein may include at least one common object. In such examples, the process 700 may include identifying the common object based at least in part on data collected by various different sensors simultaneously. Additionally or alternatively, such a common object may be identified based at least on data collected by one or more sensors at different respective times. In some examples, the first parameter determined at 702 may comprise a first location of the common object (e.g., the object 122), the second parameter determined at 704 may comprise a second location of the common object, the third parameter determined at 706 may comprise a third location of the common object, and the fourth parameter determined at 708 may comprise a fourth location of the common object. Accordingly, in such examples the difference identified at 712 may comprise a difference between at least two such locations and/or uncertainties in such determinations. For example, the difference identified at 712 may comprise a difference between the first location and the second location. In still further examples, the difference identified at 712 may comprise a difference between the first location and the fourth location.

With continued reference to FIG. 7, in any of the examples described above the object detection system 118 and/or the perception system 116 may determine at 712 that, "Yes," a difference in the various parameters being compared exists (and/or meets or exceeds some threshold). For example, the perception system 116 may determine at 712 that, "Yes," a first classification of an object (e.g., a first parameter) associated with the first group of objects 128 is different from a fourth classification of the object (e.g., a fourth parameter) associated with the fourth group of objects 120, and the system may proceed to 714 and/or to 716. Alternatively, the object detection system 118 and/or the perception system 116 may determines at 712 that, "No," a difference in the various parameters being compared does not exist. For example, the perception system 116 may determine at 712 that, "No," none of the object classifications associated the groups of objects 128, 130, 132 differ from the corresponding object classifications associated with the group of objects 120. In such examples, the system may proceed to 702.

At 714, one or more processor(s) 316 and/or other components of the vehicle computing device 304 and/or the remote computing device 334 may use information included in one or more of the signals received at 702, 704, 706 as ground truth in training the machine learning system 344 described above. For example, at 714 the perception system 116 may identify which of the one or more signals received at 702, 704, 706 is associated with the difference identified at 712. At 714, the perception system may also determine which of the one or more signals received at 702, 704, 706 includes information that may be useful for training the machine learning system 344. Such information may be used as a ground truth example for training the machine leaning system 344 at 714. In some examples, the machine learning system 344 may, either alone or in combination with the object detection system 118 or other components of the perception system 116, identify, classify, and/or categorize all objects detected in a scene.

At 716, one or more processor(s) 316 and/or other components of the vehicle computing device 304 and/or the remote computing device 334 may initiate a response, and/or any other action 126 based at least in part on determining the existence of a difference at 712. Such a response may be substantially similar to and/or the same as the one or more responses described above with respect to at least FIG. 6.

As noted above, the process 700 is illustrated as collections of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the process 700 may be combined, in whole or in part, with other processes, such as with the process 600. Likewise, the process 600 may be combined, in whole or in part, with the process 700.

The systems, modules, and methods described herein may be implemented using any combination of software and/or hardware elements. The systems, modules, and methods described herein may be implemented using one or more virtual machines operating alone or in combination with one other. Any applicable virtualization solution may be used to implement a physical computing machine platform as a virtual machine that is executed under the control of virtualization software running on a hardware computing platform or host.

EXAMPLE CLAUSES

A. An example system comprising: one or more processors; and one or more computer readable storage media communicatively coupled to the one or more processors and storing instructions executable by the one or more processors to: receive a first signal from an image capture device, the first signal including image data representing a first portion of an environment; determine, based at least in part on the image data, a first group of objects associated with the environment; receive a second signal from a light detection and ranging (LIDAR) sensor, the second signal including LIDAR sensor data representing a second portion of the environment, the second portion at least partially overlapping with the first portion; determine, based at least in part on the LIDAR sensor data, a second group of objects associated with the environment; determine a third group of objects based at least in part on the image data and the LIDAR sensor data; identify a first object included in the third group of objects, the first object being present in the first portion and the second portion of the environment, and absent from or misclassified in at least one of the first group of objects or the second group of objects; and at least one of: initiate a response based at least in part on identifying the first object, or train, based at least in part on the first signal or the second signal, a machine learning system in communication with the one or more processors.

B. The system of clause A, wherein the instructions are further executable by the one or more processors to: receive a third signal from an additional sensor, the third signal including additional sensor data representing a third portion of the environment; and determine, based at least in part on the additional sensor data, a fourth group of objects associated with the environment, the first object being present in the third portion of the environment and in the fourth group of objects.

C. The system of clause A or B, wherein: the image sensor and the LIDAR sensor are disposed on an autonomous vehicle; and the response comprises ignoring a portion of the image data or the LIDAR sensor data, modifying a weight associated with the image data or the LIDAR sensor data, modifying training data used by a machine learning system to train the image capture sensor or the LIDAR sensor generating a verification request, or causing the autonomous vehicle to change direction.

D. A method, comprising: receiving, with one or more processors, a first signal from a first sensor, the first signal including first sensor data representing an environment; determining, with the one or more processors and based at least in part on the first sensor data, a first parameter associated with a first group of objects; receiving, with the one or more processors, a second signal from a second sensor, the second signal including second sensor data representing the environment; determining, with the one or more processors and based at least in part on the second sensor data, a second parameter associated with a second group of objects; determining, with the one or more processors and based at least in part on the first sensor data and the second sensor data, a third parameter associated with a third group of objects; comparing, with the one or more processors, the first parameter or the second parameter to the third parameter to identify a difference between the third parameter and the first parameter or the second parameter; and at least one of: initiating, with the one or more processors, a response based at least in part on identifying the difference, or training, based at least in part on the first signal or the second signal, a machine learning system in communication with the one or more processors.

E. The method of clause D, wherein: the first sensor comprises a LIDAR sensor, the first sensor data comprises LIDAR sensor data, the first parameter comprises a first classification of an object in the environment, the second sensor comprises an image capture device, the second sensor data comprises image data, the second parameter comprises a second classification of the object, the third parameter comprises a third classification of the object, and the difference comprises a difference between the first classification or the second classification and the third classification.

F. The method of clause D or E, wherein: the first sensor comprises a LIDAR sensor, the first sensor data comprises LIDAR sensor data, the first parameter comprises a first determination of an existence of an object in the environment, the second sensor comprises an image capture device, the second sensor data comprises image data, the second parameter comprises a second determination of the existence of the object in the environment, the third parameter comprises a third determination of the existence of the object in the environment, and the difference comprises a difference between the first determination or the second determination and the third determination.

G. The method of clause D, E, or F, further comprising: collecting a plurality of the first sensor data over a period of time; determining, with the one or more processors, first statistical information based on the plurality of the first sensor data; comparing, with the one or more processors, the first statistical information with stored statistical information; and initiating the response based at least in part on the comparing.

H. The method of clause D, E, F, or G, wherein: the first sensor and the second sensor are disposed on a vehicle, and the response comprises at least one of ignoring a portion of the first sensor data, ignoring a portion of the second sensor data, modifying a first weight associated with the first signal, modifying a second weight associated with the second signal, modifying training data associated with the first sensor, modifying training data associated with the second sensor, generating a verification request, or causing the vehicle to change direction.

I. The method of clause D, E, F, G, or H, wherein at least one of the first parameter, the second parameter, or the third parameter comprises a location of an object, an orientation of the object, a number of objects, an uncertainty, a determination of a presence of the object, or a classification of the object.

J. The method of clause D, E, F, G, H, or I, further comprising: receiving a third signal from a third sensor, the third signal including third sensor data representing the environment; determining, based at least in part on the third sensor data, a fourth parameter associated with a fourth group of objects; and identifying a difference between the fourth parameter and the first parameter or the second parameter, wherein: the first sensor comprises an image capture device, the second sensor comprises a LIDAR sensor, and the third sensor comprises a RADAR sensor.

K. The method of clause D, E, F, G, H, I, or J, wherein the first sensor data is detected by the first sensor at a first time, and the second sensor data is detected by the second sensor at the first time, the method further comprising: identifying the difference based at least in part on additional data collected, by the first sensor or the second sensor, at a second time later than the first time.

L. The method of clause D, E, F, G, H, I, J, or K, wherein identifying the difference includes determining that an object is one of absent from or misclassified in at least one of the first group of objects or the second group of objects.

M. The method of clause D, E, F, G, H, I, J, K, or L, wherein: the first group of objects and the second group of objects comprise a common object; the first parameter comprises a first location of the common object; the second parameter comprises a second location of the common object; and the difference comprises a difference between the first location and the second location.

N. The method of clause M, wherein determining the first parameter comprises determining the first parameter using a first machine learned model and determining the second parameter comprises determining the second parameter using a second machine learned model, the machine learning system comprising the first machine leaned model or the second machine learned model, the method further comprising: training the machine learning system based at least in part on identifying the difference, wherein training the machine learning system includes using at least one of the first sensor data, the second sensor data, or the third group of objects as ground truth to train the first machine learned model or the second machine learned model.

O. The method of clause D, E, F, G, H, I, J, K, L, M, or N, wherein: the first parameter is associated with a first confidence level, the second parameter is associated with a second confidence level, and the response comprises modifying the first confidence level or the second confidence level.

P. A computer-readable storage medium having computer-executable instructions stored thereupon which, when executed by a computer, cause the computer to: receive a first signal from a first sensor, the first signal including first sensor data representing an environment; determine, based at least in part on the first sensor data, a first parameter associated with a first group of objects; receive a second signal from a second sensor, the second signal including second sensor data representing the environment; determine, based at least in part on the second sensor data, a second parameter associated with a second group of objects; determine, based at least in part on the first sensor data and the second sensor data, a third parameter associated with a third group of objects; identify a difference between the third parameter and the first parameter or the second parameter; and at least one of: initiate a response, with one or more processors, based at least in part on identifying the difference, or train, based at least in part on the first signal or the second signal, a machine learning system in communication with the one or more processors.

Q. The computer-readable storage medium of clause P, wherein the first sensor comprises an image capture device disposed on a vehicle, the second sensor comprises a LIDAR sensor disposed on the vehicle, and the computer-executable instructions, when executed by the computer, further cause the computer to: receive a third signal from a third sensor disposed on the vehicle, the third sensor comprising a RADAR sensor, the third signal including third sensor data representing the environment; and determine, based at least in part on the third sensor data, a fourth parameter associated with a fourth group of objects, wherein identifying the difference comprises identifying a difference between the third parameter and the first parameter, the second parameter, or the fourth parameter.

R. The computer-readable storage medium of clause P or Q, wherein the first group of objects and the second group of objects comprise a common object; the first parameter comprises a first classification of the common object; the second parameter comprises a second classification of the common object; and the difference comprises a difference between the first classification and the second classification.

S. The computer-readable storage medium of clause P, Q, or R, wherein at least one of the first parameter, the second parameter, or the third parameter comprises a location of an object, an orientation of the object, a number of objects, an uncertainty, a determination of a presence of the object, or a classification of the object.

T. The computer-readable storage medium of clause P, Q, R, or S, wherein: the first sensor and the second sensor are disposed on a vehicle, and the response comprises at least one of ignoring a portion of the first sensor data, ignoring a portion of the second sensor data, modifying a first weight associated with the first signal, modifying a second weight associated with the second signal, modifying training data associated with the first sensor, modifying training data associated with the second sensor, generating a verification request, or causing the vehicle to change direction.

CONCLUSION

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer readable storage media communicatively coupled to the one or more processors and storing instructions executable by the one or more processors to:
receive a first signal from an image capture device, the first signal including image data representing a first portion of an environment;
determine, based at least in part on the image data, a first group of objects associated with the environment;
receive a second signal from a light detection and ranging (LIDAR) sensor, the second signal including LIDAR sensor data representing a second portion of the environment, the second portion at least partially overlapping with the first portion;
determine, based at least in part on the LIDAR sensor data, a second group of objects associated with the environment;
determine a third group of objects based at least in part on the image data and the LIDAR sensor data;
identify a first object included in the third group of objects,
the first object being present in the first portion and the second portion of the environment, and absent from or misclassified in at least one of the first group of objects or the second group of objects; and
at least one of:
initiate a response based at least in part on identifying the first object, or
train, based at least in part on the first signal or the second signal, a machine learning system in communication with the one or more processors.

2. The system of claim 1, wherein the instructions are further executable by the one or more processors to:
receive a third signal from an additional sensor, the third signal including additional sensor data representing a third portion of the environment; and
determine, based at least in part on the additional sensor data, a fourth group of objects associated with the environment,
the first object being present in the third portion of the environment and in the fourth group of objects.

3. The system of claim 1, wherein:
the image sensor and the LIDAR sensor are disposed on an autonomous vehicle; and
the response comprises ignoring a portion of the image data or the LIDAR sensor data, modifying a weight associated with the image data or the LIDAR sensor data, modifying training data used by a machine learning system to train the image capture sensor or the LIDAR sensor generating a verification request, or causing the autonomous vehicle to change direction.

4. A method, comprising:
receiving, with one or more processors, a first signal from a first sensor, the first signal including first sensor data representing an environment;
determining, with the one or more processors and based at least in part on the first sensor data, a first parameter associated with a first group of objects;
receiving, with the one or more processors, a second signal from a second sensor, the second signal including second sensor data representing the environment;

determining, with the one or more processors and based at least in part on the second sensor data, a second parameter associated with a second group of objects;
determining, with the one or more processors and based at least in part on the first sensor data and the second sensor data, a third parameter associated with a third group of objects;
comparing, with the one or more processors, the first parameter or the second parameter to the third parameter to identify a difference between the third parameter and the first parameter or the second parameter; and
at least one of:
  initiating, with the one or more processors, a response based at least in part on identifying the difference, or
  training, based at least in part on the first signal or the second signal, a machine learning system in communication with the one or more processors.

5. The method of claim 4, wherein:
the first sensor comprises a LIDAR sensor,
the first sensor data comprises LIDAR sensor data,
the first parameter comprises a first classification of an object in the environment,
the second sensor comprises an image capture device,
the second sensor data comprises image data,
the second parameter comprises a second classification of the object,
the third parameter comprises a third classification of the object, and
the difference comprises a difference between the first classification or the second classification and the third classification.

6. The method of claim 4, wherein:
the first sensor comprises a LIDAR sensor,
the first sensor data comprises LIDAR sensor data,
the first parameter comprises a first determination of an existence of an object in the environment,
the second sensor comprises an image capture device,
the second sensor data comprises image data,
the second parameter comprises a second determination of the existence of the object in the environment,
the third parameter comprises a third determination of the existence of the object in the environment, and
the difference comprises a difference between the first determination or the second determination and the third determination.

7. The method of claim 4, further comprising:
collecting a plurality of the first sensor data over a period of time;
determining, with the one or more processors, first statistical information based on the plurality of the first sensor data;
comparing, with the one or more processors, the first statistical information with stored statistical information; and
initiating the response based at least in part on the comparing.

8. The method of claim 4, wherein:
the first sensor and the second sensor are disposed on a vehicle, and
the response comprises at least one of ignoring a portion of the first sensor data, ignoring a portion of the second sensor data, modifying a first weight associated with the first signal, modifying a second weight associated with the second signal, modifying training data associated with the first sensor, modifying training data associated with the second sensor, generating a verification request, or causing the vehicle to change direction.

9. The method of claim 4, wherein at least one of the first parameter, the second parameter, or the third parameter comprises a location of an object, an orientation of the object, a number of objects, an uncertainty, a determination of a presence of the object, or a classification of the object.

10. The method of claim 4, further comprising:
receiving a third signal from a third sensor, the third signal including third sensor data representing the environment;
determining, based at least in part on the third sensor data, a fourth parameter associated with a fourth group of objects; and
identifying a difference between the fourth parameter and the first parameter or the second parameter, wherein:
  the first sensor comprises an image capture device,
  the second sensor comprises a LIDAR sensor, and
  the third sensor comprises a RADAR sensor.

11. The method of claim 4, wherein
the first sensor data is detected by the first sensor at a first time, and
the second sensor data is detected by the second sensor at the first time, the method further comprising:
  identifying the difference based at least in part on additional data collected, by the first sensor or the second sensor, at a second time later than the first time.

12. The method of claim 4, wherein identifying the difference includes determining that an object is one of absent from or misclassified in at least one of the first group of objects or the second group of objects.

13. The method of claim 4, wherein:
the first group of objects and the second group of objects comprise a common object;
the first parameter comprises a first location of the common object;
the second parameter comprises a second location of the common object; and
the difference comprises a difference between the first location and the second location.

14. The method of claim 13, wherein determining the first parameter comprises determining the first parameter using a first machine learned model and determining the second parameter comprises determining the second parameter using a second machine learned model, the machine learning system comprising the first machine leaned model or the second machine learned model, the method further comprising:
training the machine learning system based at least in part on identifying the difference, wherein training the machine learning system includes using at least one of the first sensor data, the second sensor data, or the third group of objects as ground truth to train the first machine learned model or the second machine learned model.

15. The method of claim 4, wherein:
the first parameter is associated with a first confidence level,
the second parameter is associated with a second confidence level, and
the response comprises modifying the first confidence level or the second confidence level.

16. A computer-readable storage medium having computer-executable instructions stored thereupon which, when executed by a computer, cause the computer to:

receive a first signal from a first sensor, the first signal including first sensor data representing an environment;

determine, based at least in part on the first sensor data, a first parameter associated with a first group of objects;

receive a second signal from a second sensor, the second signal including second sensor data representing the environment;

determine, based at least in part on the second sensor data, a second parameter associated with a second group of objects;

determine, based at least in part on the first sensor data and the second sensor data, a third parameter associated with a third group of objects;

identify a difference between the third parameter and the first parameter or the second parameter; and at least one of:
    initiate a response, with one or more processors, based at least in part on identifying the difference, or
    train, based at least in part on the first signal or the second signal, a machine learning system in communication with the one or more processors.

17. The computer-readable storage medium of claim 16, wherein
the first sensor comprises an image capture device disposed on a vehicle,
the second sensor comprises a LIDAR sensor disposed on the vehicle, and
the computer-executable instructions, when executed by the computer, further cause the computer to:
    receive a third signal from a third sensor disposed on the vehicle, the third sensor comprising a RADAR sensor, the third signal including third sensor data representing the environment; and
    determine, based at least in part on the third sensor data, a fourth parameter associated with a fourth group of objects, wherein identifying the difference comprises identifying a difference between the third parameter and the first parameter, the second parameter, or the fourth parameter.

18. The computer-readable storage medium of claim 16, wherein
the first group of objects and the second group of objects comprise a common object;
the first parameter comprises a first classification of the common object;
the second parameter comprises a second classification of the common object; and
the difference comprises a difference between the first classification and the second classification.

19. The computer-readable storage medium of claim 16, wherein at least one of the first parameter, the second parameter, or the third parameter comprises a location of an object, an orientation of the object, a number of objects, an uncertainty, a determination of a presence of the object, or a classification of the object.

20. The computer-readable storage medium of claim 16, wherein:
the first sensor and the second sensor are disposed on a vehicle, and
the response comprises at least one of ignoring a portion of the first sensor data, ignoring a portion of the second sensor data, modifying a first weight associated with the first signal, modifying a second weight associated with the second signal, modifying training data associated with the first sensor, modifying training data associated with the second sensor, generating a verification request, or causing the vehicle to change direction.

* * * * *